United States Patent
Wampler

(10) Patent No.: US 10,140,764 B2
(45) Date of Patent: Nov. 27, 2018

(54) GENERATING EFFICIENT, STYLIZED MESH DEFORMATIONS USING A PLURALITY OF INPUT MESHES

(71) Applicant: Adobe Systems Incorporated, San Jose, CA (US)

(72) Inventor: Kevin Wampler, Seattle, WA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 15/439,736

(22) Filed: Feb. 22, 2017

(65) Prior Publication Data
US 2018/0130256 A1  May 10, 2018

Related U.S. Application Data

(60) Provisional application No. 62/420,163, filed on Nov. 10, 2016.

(51) Int. Cl.
| | |
|---|---|
| *G06T 13/20* | (2011.01) |
| *G06T 17/20* | (2006.01) |
| *G06T 19/20* | (2011.01) |

(52) U.S. Cl.
CPC ............ *G06T 17/205* (2013.01); *G06T 13/20* (2013.01); *G06T 17/20* (2013.01); *G06T 19/20* (2013.01); *G06T 2200/24* (2013.01); *G06T 2219/2021* (2013.01)

(58) Field of Classification Search
None
See application file for complete search history.

(56) References Cited

PUBLICATIONS

Alexa, M., Cohen-Or, D., and Levin, D. 2000. As-rigid-as-possible shape interpolation. In Proceedings of the 27th Annual Conference on Computer Graphics and Interactive Techniques, ACM Press/ Addison-Wesley Publishing Co., New York, NY, USA, SIGGRAPH '00, 157-164.

Baran, I., and Popovic , J. 2007. Automatic rigging and animation of 3d characters. ACM Trans. Graph. 26, 3 (July).

Bergeron, P., and Lachapelle, P. 1985. Controlling facial expressions and body movements in the computer generated animated short 'Tony de Peltrie'. In SigGraph '85 Tutorial Notes, Advanced Computer Animation Course.

(Continued)

*Primary Examiner* — Yingchun He
(74) *Attorney, Agent, or Firm* — Keller Jolley Preece

(57) ABSTRACT

The present disclosure includes methods and systems for manipulating digital models based on user input. In particular, disclosed systems and methods can generate modified meshes in real time based on a plurality of input meshes and user manipulation of one or more control points. For example, one or more embodiments of the disclosed systems and methods generate modified meshes from a plurality of input meshes based on a combined shape-space, deformation interpolation measure. Moreover, in one or more embodiments, the disclosed systems and methods utilize an as-rigid-as-possible-deformation measure to combine input meshes into a modified mesh. Further, the disclosed systems and methods can variably combine input shapes over different portions of a modified mesh, providing increased expressiveness while reducing artifacts and increasing computing efficiency.

20 Claims, 14 Drawing Sheets

(56) References Cited

PUBLICATIONS

Botsch, M., and Sorkine, O. 2008. On linear variational surface deformation methods. IEEE Transactions on Visualization and Computer Graphics 14, 1 (Jan.), 213-230.

Boyd, S., and Vandenberghe, L. 2004. Convex Optimization. Cambridge University Press, New York, NY, USA.

Chao, I., Pinkall, U., Sanan, P., and Schroder, P. 2010. A simple geometric model for elastic deformations. ACM Trans. Graph. 29, 4 (July), 38:1-38:6.

Der, K. G., Sumner, R. W., and Popovic, J. 2006. Inverse kinematics for reduced deformable models. In ACM SIGGRAPH 2006 Papers, ACM, New York, NY, USA, SIGGRAPH '06, 1174-1179.

Feng, W.-W., Kim, B.-U., and Yu, Y. 2008. Real-time data driven deformation using kernel canonical correlation analysis. ACM Transactions on Graphics (TOG) 27, 3, 91.

Frohlich, S., and Botsch, M. 2011. Example-driven deformations based on discrete shells. Computer Graphics Forum 30, 8, 2246-2257.

Gao, L., Lai, Y.-K., Huang, Q.-X., and Hu, S.-M. 2013. A data-driven approach to realistic shape morphing. In Computer graphics forum, vol. 32, Wiley Online Library, 449-457.

Gill, P. E., Murray, W., and Saunders, M. A. 1997. Snopt: An sqp algorithm for large-scale constrained optimization. Siam Journal on Optimization 12, 979-1006.

Grochow, K., Martin, S. L., Hertzmann, A., and Popovic, Z. 2004. Style-based inverse kinematics. ACM Trans. Graph. 23, 3 (Aug.), 522-531.

Hahn, F., Thomaszewski, B., Coros, S., Sumner, R. W., Cole, F., Meyer, M., Derose, T., and Gross, M. 2014. Subspace clothing simulation using adaptive bases. ACM Trans. Graph. 33, 4 (July), 105:1-105:9.

Huang, H., Zhao, L., Yin, K., Qi, Y., Yu, Y., and Tong, X. 2011. Controllable hand deformation from sparse examples with rich details. In Proceedings of the 2011 ACM SIGGRAPH/Eurographics Symposium on Computer Animation, ACM, New York, NY, USA, SCA '11, 73-82.

Igarashi, T., Moscovich, T., and Hughes, J. F. 2005. As-rigid-as-possible shape manipulation. ACM Trans. Graph. 24, 3 (July), 1134-1141.

Jacobson, A., Baran, I., Popovi'c, J., and Sorkine, O. 2011. Bounded biharmonic weights for real-time deformation. ACM Transactions on Graphics (proceedings of ACM SIGGRAPH) 30, 4, 78:1-78:8.

Jacobson, A., Baran, I., Kavan, L., Popovic, J., and Sorkine, O. 2012. Fast automatic skinning transformations. ACM Transactions on Graphics (proceedings of ACM SIGGRAPH) 31, 4, 77:1-77:10.

Jacobson, A., Weinkauf, T., and Sorkine, O. 2012. Smooth shape-aware functions with controlled extrema. Computer Graphics Forum (proceedings of EUROGRAPHICS/ACM SIGGRAPH Symposium on Geometry Processing) 31, 5, 1577-1586.

Jones, B., Popovic, J., McCann, J., Li, W., and Bargteil, A. 2013. Dynamic sprites. In Proceedings of Motion on Games, ACM, New York, NY, USA, MIG '13, 17:39-17:46.

Jones, B., Thuerey, N., Shinar, T., and Bargteil, A. W. 2016. Example-based plastic deformation of rigid bodies. ACM Trans. on Graphics 35, 4 (July).

Kilian, M., Mitra, N. J., and Pottmann, H. 2007. Geometric modeling in shape space. ACM Trans. Graph. 26, 3 (July).

Koyama, Y., Takayama, K., Umetani, N., and Igarashi, T. 2012. Real-time example-based elastic deformation. In Proceedings of the ACM SIGGRAPH/Eurographics Symposium on Computer Animation, Eurographics Association, Aire-la-Ville, Switzerland, SCA '12, 19-24.

Levi, Z., and Gotsman, C. 2015. Smooth rotation enhanced as-rigid-as-possible mesh animation. 264-277.

Lewis, J. P., and Anjyo, K.-I. 2010. Direct manipulation blendshapes. IEEE Comput. Graph. Appl. 30, 4 (July), 42-50.

Lewis, J. P., Cordner, M., and Fong, N. 2000. Pose space deformation: a unified approach to shape interpolation and skeleton-driven deformation. In Proceedings of the 27th annual conference on Computer graphics and interactive techniques, ACM Press/Addison-Wesley Publishing Co., 165-172.

Liu, L., Zhang, L., Xu, Y., Gotsman, C., and Gortler, S. J. 2008. A local/global approach to mesh parameterization. In Proceedings of the Symposium on Geometry Processing, Eurographics Association, Aire-la-Ville, Switzerland, Switzerland, SGP '08, 1495-1504.

Martin, S., Thomaszewski, B., Grinspun, E., and Gross, M. 2011. Example-based elastic materials. ACM Trans. Graph. 30, 4 (July), 72:1-72:8.

Milliez, A., Wand, M., Cani, M.-P., and Seidel, H.-P.2013. Mutable elastic models for sculpting structured shapes. In Computer Graphics Forum, vol. 32, Wiley Online Library, 21-30.

Nieto, J., and Susn, A. 2013. Cage based deformations: A survey. In Deformation Models, M. Gonzlez Hidalgo, A. Mir Torres, and J. Varona Gmez, Eds., vol. 7 of Lecture Notes in Computational Vision and Biomechanics. Springer Netherlands, 75-99.

Schumacher, C., Thomaszewski, B., Coros, S., Martin, S., Sumner, R., and Gross, M. 2012. Efficient simulation of example-based materials. In Proceedings of the ACM SIGGRAPH/Eurographics Symposium on Computer Animation, Eurographics Association, Aire-la-Ville, Switzerland, Switzerland, SCA '12, 1-8.

Sederberg, T. W., and Parry, S. R. 1986. Free-form deformation of solid geometric models. SIGGRAPH Comput. Graph. 20, 4 (Aug.), 151-160.

Seo, J., Irving, G., Lewis, J. P., and Noh, J. 2011. Compression and direct manipulation of complex blendshape models. ACM Trans. Graph. 30, 6 (Dec.), 164:1-164:10.

Sheffer, A., and Kraevoy, V. 2004. Pyramid coordinates for morphing and deformation. In Proceedings of the 3D Data Processing, Visualization, and Transmission, 2Nd International Symposium, IEEE Computer Society, Washington, DC, USA, 3DPVT '04, 68-75.

Sloan, P.-P. J., Rose III, C. F., and Cohen, M. F. 2001. Shape by example. In Proceedings of the 2001 symposium on Interactive 3D graphics, ACM, 135-143.

Song, C., Zhang, H., Wang, X., Han, J., and Wang, H. 2014. Fast corotational simulation for example-driven deformation. Computers & Graphics 40, 49-57.

Sorkine, O., and Alexa, M. 2007. As-rigid-as-possible surface modeling. In Proceedings of the Fifth Eurographics Symposium on Geometry Processing, Eurographics Association, Aire-la-Ville, Switzerland, Switzerland, SGP '07, 109-116.

Sumner, R. W., and Popovic, J. 2004. Deformation transfer for triangle meshes. ACM Trans. Graph. 23,3 (Aug.), 399-405.

Sumner, R. W., Zwicker, M., Gotsman, C., and Popovic, J. 2005. Mesh-based inverse kinematics. In ACM SIGGRAPH 2005 Papers, ACM, New York, NY, USA, SIGGRAPH '05, 488-495.

Twigg, C. D., and Kacic-Alesic, Z. 2010. Point cloud glue: Constraining simulations using the procrustes transform. In Proceedings of the 2010 ACM SIGGRAPH/Eurographics Symposium on Computer Animation, Eurographics Association, Aire-la-Ville, Switzerland, Switzerland, SCA '10, 45-54.

Wang, Y., Jacobson, A., Barbic, J., and Kavan, L. 2015. Linear subspace design for real-time shape deformation. ACM Trans. Graph. 34, 4.

Wareham, R., and Lasenby, J. 2008. Bone glow: An improved method for the assignment of weights for mesh deformation. In AMDO, Springer, F. J. P. Lpez and R. B. Fisher, Eds., vol. 5098 of Lecture Notes in Computer Science, 63-71.

Weber, O., Sorkine, O., Lipman, Y., and Gotsman, C. 2007. Context-aware skeletal shape deformation. In Computer Graphics Forum, vol. 26, Wiley Online Library, 265-274.

Zhang, L., Snavely, N., Curless, B., and Seitz, S. M. 2004. Spacetime faces: High resolution capture for modeling and animation. ACM Trans. Graph. 23, 3 (Aug.), 548-558.

Zhang, W., Zheng, J., and Thalmann, N. M. 2015. Real-Time Subspace Integration for Example-Based Elastic Material. Computer Graphics Forum.

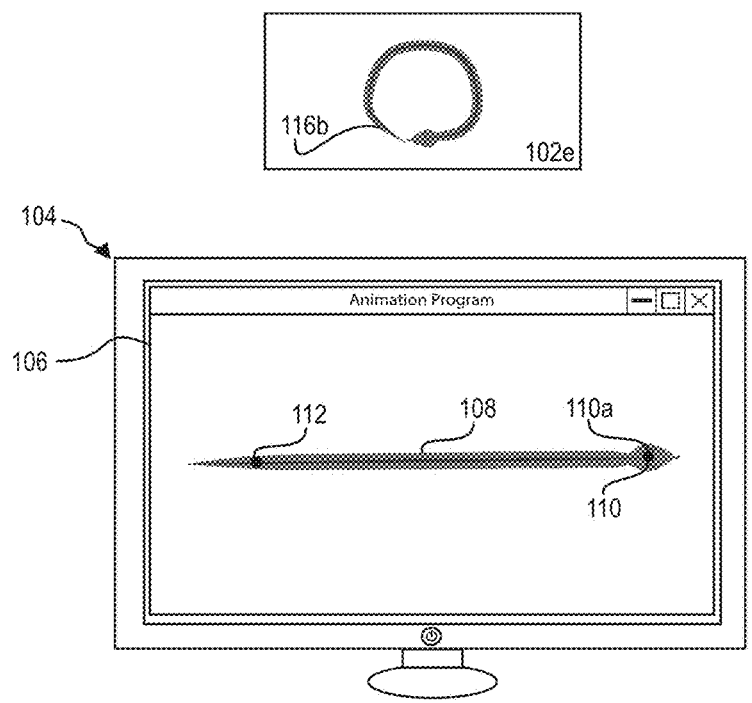
FIG. 1A
FIG. 1B
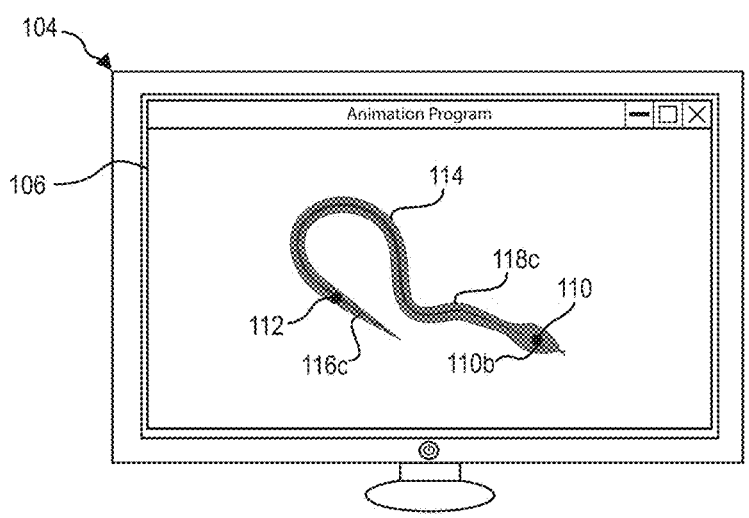
FIG. 1C

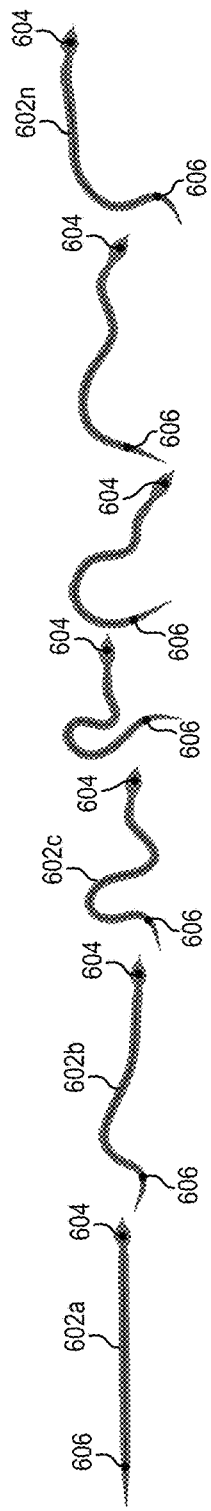
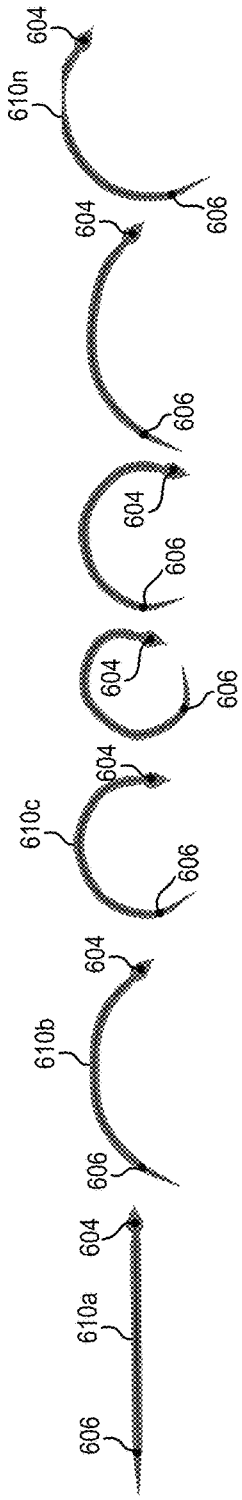
FIG. 6A
FIG. 6B (Prior Art)

GENERATING EFFICIENT, STYLIZED MESH DEFORMATIONS USING A PLURALITY OF INPUT MESHES

CROSS REFERENCE TO RELATED APPLICATIONS

This application claims the benefit of priority to U.S. Provisional Patent Application No. 62/420,163, filed Nov. 10, 2016, and titled Generating Efficient, Stylized Mesh Deformations Using A Plurality Of Input Meshes, which is incorporated herein by reference in its entirety.

BACKGROUND

Recent years have seen rapid development in digital shape deformation technology. Indeed, due to advances in algorithms and hardware, conventional digital deformation systems are now able to manipulate a digital shape (i.e., a digital mesh) based on a variety of user inputs. Thus, for instance, conventional digital deformation systems can receive user input in relation to a portion of a digital mesh and automatically modify (e.g., stretch, bend, or rotate) the remainder of the digital mesh.

Although conventional shape deformation systems have progressed in recent years, they still have a number of significant shortcomings. For instance, one branch of digital deformation systems utilizes an as-rigid-as-possible approach. Such deformation systems determine deformations of an input mesh by minimizing the sum of local deviations from perfect rigidity.

Although conventional as-rigid-as-possible deformation systems have a number of benefits (they are relatively simple to formulate and efficient to compute), they also have a number of shortcomings. For example, given that conventional as-rigid-as-possible systems emphasize rigidity over an input mesh, such systems tend to generate deformations that appear stiff and unyielding. For example, deformations from an as-rigid-as-possible system often appear as if the shape is deforming from a stiff sheet of rubber. Although such an approach may be desirable in certain applications, users often seek more fluid deformations of an input shape.

Similarly, conventional as-rigid-as-possible deformation systems have historically been formulated with respect to a single input shape, which limits artistic control in generating modified shapes. For example, although many conventional as-rigid-as-possible deformation systems can deform an input shape by bending or stretching the input shape, such systems generally fail to allow users to modify shapes in more complex, realistic animations by combining multiple example input shapes.

Other conventional deformation systems provide additional artistic control by utilizing example-based deformation approaches. In such systems, a user provides multiple input shapes and the example-based deformation systems combine the input shapes to generate modified shapes. This approach allows shapes to deform more realistically based on the multiple input shapes. However, such systems also introduce a number of additional problems depending on the particular approach.

For instance, many example-based deformation approaches are not well-suited to inverse kinematic applications (i.e., applications where a user provides positional constraints on localized portions of the mesh and the system calculate deformed shapes from the user-specified constraints, rather than physical simulation). For example, some example-based deformation systems have difficulty transitioning between multiple input shapes in response to user input. Indeed, some example-based deformation systems in inverse kinematic applications jump or skip from one input shape to another input shape, rather than smoothly deforming between input shapes.

Similarly, some conventional example-based systems generate suboptimal solutions arising from local minima, which results in artifacts and discontinuous jumps in modifying a mesh. Moreover, some systems simply ignore some input shapes in generating deformed shapes. Thus, rather than shapes transitioning in a manner anticipated by a user based on example inputs, such conventional systems can result in changes and modifications contrary to user expectations.

In addition, although conventional example-based deformation systems can globally combine input meshes, such global combinations often result in artifacts in resulting shapes. Indeed, because conventional example-based deformation systems cannot variably combine input meshes over different portions of a deformed shape, combinations that may result in normal deformations in one portion of a resulting modified mesh may cause strange artifacts in another portion of the modified mesh. Some systems seek to overcome this limitation by requiring a large number of input meshes and then utilizing the large number of input meshes to generate a variety of different expressive deformations; however, this approach places an excessive burden on users to generate a significant number of input meshes in order obtain desired deformation results.

Moreover, some conventional deformation systems generate modified meshes in dynamic applications (i.e., in the context of physical simulation). Such dynamic systems, however, generally require a variety of input parameters (e.g., for modeling the physical characteristics of the physical simulation), physical dynamic equations, and constraints. In addition, such systems are generally not well suited to accommodate meshes that do not reflect deformation of physical materials. Accordingly, such systems generally struggle to generate modified meshes without input parameters and/or where input shapes are highly-stylized (e.g., cartoonish, rather than simulated physical deformations).

Furthermore, although many digital deformation systems can generate deformation shapes, they require significant computer processing time, power, and memory to operate. Accordingly, many conventional digital deformation systems are unable to provide deformed shapes based on a range of different input shapes while running fast enough for utilization in real-time applications (e.g., real-time animation).

These and other problems exist with regard to generating stylized digital shape deformations.

BRIEF SUMMARY

One or more embodiments of the present disclosure provide benefits and/or solve one or more of the foregoing or other problems in the art with systems and methods that quickly and efficiently manipulate digital models in response to user input based on sample configurations of the digital model (i.e., input meshes). In particular, in one or more embodiments, the disclosed systems and methods generate modified meshes in real time based on a plurality of input meshes while avoiding artifacts associated with conventional systems. Specifically, in response to input indicating movement of a control point of a digital model, the disclosed systems and methods analyze input meshes reflecting different configurations of the digital model and generate modified meshes. The disclosed systems and methods can do so while reliably including input shapes in an intuitive manner, smoothly transitioning between modified meshes, and avoiding artifacts resulting from local minima in manipulating digital models. Thus, for example, the disclosed systems and methods generate real-time digital animations comprising a plurality of high quality deformations for a wide range of input meshes (including highly stylized shapes).

In one or more embodiments, the disclosed systems and methods generate modified meshes by utilizing a new measure of example-based elastic energy. In particular, the disclosed systems and methods utilize a combined shape-space, deformation interpolation measure to manipulate a digital model. By utilizing this combined shape-space, deformation interpolation measure, the disclosed systems and methods can resolve artifacts introduced by conventional systems.

Furthermore, in one or more embodiments, the disclosed systems and methods utilize an as-rigid-as-possible-deformation measure to combine multiple input meshes and generate modified meshes. For example, the disclosed systems and methods can utilize an as-rigid-as-possible deformation measure within a reduced linear subspace (i.e., by utilizing linear blend skinning). In this manner, the disclosed systems and methods can obtain a variety of benefits, including efficiency in computing, while also providing additional artistic control in combining multiple input shapes to provide more realistic, visually pleasing, manipulations (e.g., animations).

Moreover, the disclosed systems and methods can also support spatially localized changes in how different example shapes are combined. Indeed, the disclosed systems and methods can generate a digital mesh that utilizes different combinations of different input shapes across different portions of the digital mesh. This allows for locally optimized deformations that avoid artifacts resulting from global combination of input meshes. In addition, variably combining different input shapes allows users to generate a wide variety of expressive deformations from a relatively limited number of input meshes.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

The detailed description is described with reference to the accompanying drawings in which:

FIGS. 1A-1C illustrate a representation of manipulating a digital model via a computing device based on a plurality of input meshes in accordance with one or more embodiments;

FIGS. 6A-6B illustrate a comparison of manipulating a digital model based on one or more embodiments of the stylized mesh deformation system and based on one or more conventional systems;

DETAILED DESCRIPTION

Figure 2A:
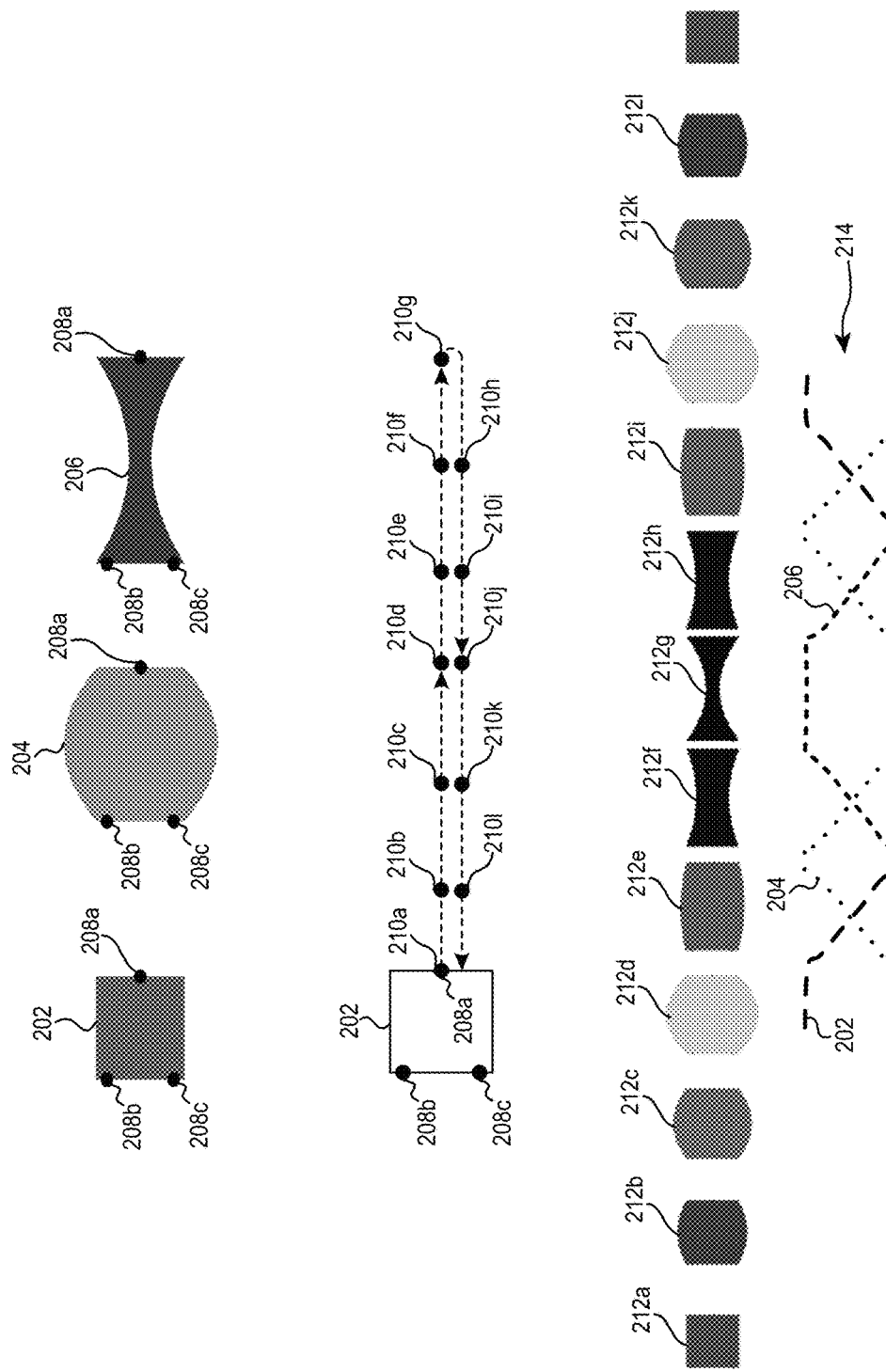
FIG. 2A illustrates a representation of manipulating a digital model based on user interaction with a control point in accordance with one or more embodiments.

One or more embodiments of the present disclosure include a stylized mesh deformation system that manipulates a digital model based on a plurality of input. In particular, the stylized mesh deformation system receives a plurality of input meshes that reflect different configurations of a digital model, and then generates a modified mesh that combines the plurality of input meshes in response to input to manipulate the digital model. Thus, for example, the stylized mesh deformation system generates a modified mesh that reflects a combination of different configurations of the input meshes. Accordingly, the stylized mesh deformation system provides a way for virtual shapes or characters to be easily authored and manipulated.

For example, in one or more embodiments, the stylized mesh deformation system receives input to manipulate a digital model defined by a mesh of vertices. In particular, the input can include an indication of movement of a control point of the digital model to a new location. Moreover, the stylized mesh deformation system identifies a plurality of input meshes of the digital model, where each input mesh comprises the mesh of vertices in a different configuration. The stylized mesh deformation system determines a combined shape-space, deformation interpolation measure associated with movement of the control point to the new location for the plurality of input meshes. For instance, in one or more embodiments, the stylized mesh deformation system generates a combined shape-space, deformation interpolation measure based on (1) an amount of deformation of each input mesh to satisfy input constraints (i.e., an "input mesh deformation interpolation measure") and (2) an amount of deformation of a blended mesh generated in a shape space defined by the input meshes to satisfy input constraints (i.e., a "shape-space deformation measure"). The stylized mesh deformation system generates a modified mesh by optimizing the combined shape-space, deformation interpolation measure over the plurality of meshes with the control point at the new location.

The stylized mesh deformation system provides a number of advantages over existing digital deformation systems. As an initial matter, in one or more embodiments, the stylized mesh deformation system reliably reflects input meshes. In particular, the stylized mesh deformation system uses input meshes in generating deformed shapes in an intuitive and predictable manner, even for highly stylized inputs. Thus, the stylized mesh deformation system can avoid omitting or skipping certain input meshes in generating deformed shapes.

In addition, the stylized mesh deformation system avoids creating a variety of other artifacts associated with conventional systems. For example, the stylized mesh deformation system generates modified meshes that smoothly transition between shapes while avoiding sporadic lurching, abrupt jumps between shapes, or undesirable artifacts resulting from local minima.

Moreover, the stylized mesh deformation system provides users with additional avenues for creative expression. Indeed, the stylized mesh deformation system can generate a wide range of visually plausible deformations from a relatively small set of input meshes. For instance, not only can the stylized mesh deformation system reliably combine a variety of input meshes to generate modified meshes, the stylized mesh deformation system can combine input meshes in a way which spatially varies smoothly across a resulting modified mesh. Accordingly, the stylized mesh deformation system can utilize different combinations of input meshes across a deformed shape, which allows for a variety of additional, realistic configurations.

Additionally, the stylized mesh deformation system can generate a variety of modified meshes in relation to a wide variety of input shapes (i.e., input meshes). For instance, the stylized mesh deformation system can generate modified meshes of stylized, cartoonish, caricatures in addition to modified meshes of realistic objects, people, animals, or objects. Significantly, the stylized mesh deformation system can generate modified shapes without parameters for modeling physical simulations. Rather, the stylized mesh deformation system can utilize input meshes reflecting example configurations of a digital model and generate modified meshes of the digital model.

Furthermore, the stylized mesh deformation system is fast enough to produce high-quality deformations in real time. Accordingly, the stylized mesh deformation system improves the functioning of computing devices utilized to manipulate digital models. For example, a user can select and drag a control point of a digital model, and in response, the stylized mesh deformation system can generate an animation comprising a plurality of modified meshes that varies as the user changes the location of the control point to new positions. Accordingly, the stylized mesh deformation system can provide the modified meshes for display in real time, which gives an easy way for a set of sketches to be brought to life through simple inputs.

In sum, the stylized mesh deformation system provides a technique for real-time kinematic example-based mesh deformation that achieves high-quality and intuitive results across a wide range of cases (with no parameter tuning), including highly non-physical stylized inputs.

As mentioned above, in one or more embodiments, the stylized mesh deformation system obtains these advantages by utilizing a combined shape-space, deformation interpolation measure to generate a modified mesh. In particular, in one or more embodiments, the stylized mesh deformation system utilizes a combined shape-space, deformation interpolation measure to determine how (i.e., to what degree) to combine input meshes to generate a modified mesh. For instance, in one or more embodiments, the stylized mesh deformation system generates a combined shape-space, deformation interpolation measure based on (1) an amount of deformation of each input mesh to satisfy input constraints (i.e., an "input mesh deformation interpolation measure") and (2) an amount of deformation of a blended mesh generated in a shape space defined by the input meshes to satisfy input constraints (i.e., a "shape-space deformation measure"). The stylized mesh deformation system can then optimize the combined shape-space, deformation interpolation measure to determine weights for combining the different input meshes to generate a modified mesh. Utilizing the combined shape-space, deformation interpolation measure, the stylized mesh deformation system can smoothly combine input meshes in response to changing user input, avoiding the artifacts common to conventional systems described above.

In addition, in one or more embodiments the stylized mesh deformation system utilizes an as-rigid-as-possible-deformation measure to combine multiple input meshes. An as-rigid-as-possible-deformation measure reflects a localized degree of non-rigidity (e.g., an amount of localized translation and/or rotation to generate a modified mesh). Utilizing an as-rigid-as-possible-deformation measure to combine multiple input meshes, the stylized mesh deformation system can obtain efficiencies in processing requirements while also obtaining invariance to rigid transformations, and minimization of scale and shear distortions. Moreover, the stylized mesh deformation system can also provide additional artistic control. For example, the stylized mesh deformation system combines multiple input shapes to provide more realistic manipulations that do not appear stiff and unyielding.

Indeed, in one or more embodiments, the disclosed systems and methods utilize an as-rigid-as-possible deformation measure that reflects a combined shape-space, deformation interpolation measure (referred to as an ARAP combined shape-space, deformation interpolation measure). Specifically, the disclosed systems and methods can utilize an as-rigid-as-possible-deformation measure that reflects an amount of as-rigid-as-possible deformation from each input mesh to satisfy input constraints and an amount of as-rigid-as-possible deformation from a blended shape from the input to meshes to satisfy input constraints. In one or more embodiments, the disclosed systems and methods utilize this approach to obtain computational efficiencies so as to generate high-quality deformations in real time, even for high-resolution meshes.

Furthermore, the stylized mesh deformation system can also smoothly vary the degree to which each input shape is used over a resulting mesh. For example, as outlined below, the stylized mesh deformation system can utilize an ARAP combined shape-space, deformation interpolation measure to generate different combinations of different input shapes over different portions of a modified mesh. By providing such spatially localized combinations of input meshes, the stylized mesh deformation system generates more realistic animations and avoid artifacts that result from utilizing a global combination of input shapes.

Turning now to FIGS. 1A-1C, additional detail will be provided regarding generating a modified mesh based on a plurality of input meshes in accordance with one or more embodiments. In particular, FIG. 1A illustrates a plurality of input meshes 102a-102e. As shown, each of the input meshes 102a-102e comprises a different configuration of the same digital model (i.e., a model of a snake). In particular, the input meshes 102a-102e comprise different configuration of a digital model comprising a mesh of vertices. Accordingly, each of the input meshes comprise a set of common vertices arranged in different configurations (i.e., locations).

As used herein, the term "digital model" refers to a digital representation of an object. For instance, a digital model can include a representation of an object defined by a mesh (e.g., a polygonal mesh). Specifically, a digital model can include a representation defined by a polygonal mesh of vertices connected by edges. Similarly, as used herein, the term "mesh" refers to a set of vertices utilized to represent a digital object. In particular, the term "mesh" includes a set of vertices connected by a set of edges defining polygons utilized to represent a digital object. For instance, the term "mesh" can include a set of vertices and a set of edges defining triangles that collectively represent a digital object. A mesh can represent two-dimensional or three-dimensional objects. For example, in relation to FIG. 1A, the input meshes 102a-102e each comprise a plurality of vertices connected by edges that define two-dimensional triangles, which collectively represent a particular configuration of a snake.

In one or more embodiments, the stylized mesh deformation system provides an initial mesh for display with control points to allow a user to provide user input for generating a modified mesh. In particular, FIG. 1B illustrates the computing device 104 displaying an initial mesh 108 with the control points 110, 112 reflecting handles for controlling the location of corresponding vertices in the initial mesh 108. As used herein, the term "control point" refers to a digital item for controlling a location of one or more vertices of a mesh. For instance, a control point includes a handle that a user can interact with (e.g., select and drag) to move a corresponding vertex (or group of vertices) in a mesh. A control point also includes a handle that a user can interact with to fix a one or more vertices in a mesh (e.g., so the corresponding one or more vertices cannot move). In addition to a handle, a control point includes any digital item that a user can utilize to control the location of one or more vertices. For example, rather than select and drag a handle, a user can provide user input (e.g., entry of coordinates) to a computing device that defines the location of one or more vertices (i.e., a control point). To illustrate, a user can provide user input (e.g., entry of coordinates) that define movement of a control point over time to generate a digital animation based on movement of the control point. Still further, an algorithm or other source of input can dictate the location of the control points to control movement of the digital model. Alternatively, a user can select and drag a control point over time to generate a digital animation based on movement of the control point.

As shown, in one or more embodiments, the stylized mesh deformation system selects the initial mesh 108 from the input meshes 102a-102e. In particular, the stylized mesh deformation system selects the input mesh 102b and provides input mesh 102b for display via the computing device 104 with the control points 110, 112 to allow a user to interact with the control points 110, 112 and generate a modified mesh. Alternatively, the initial mesh 108 does not correspond with any of the input meshes 102a-102e.

In one or more embodiments, the stylized mesh deformation system generates the control points. For instance, the stylized mesh deformation system can receive user input (e.g., selection) of one or more vertices and generate control points corresponding to the vertices. For example, in relation to FIG. 1, a user selects vertices of the initial mesh 108 and, in response, the stylized mesh deformation system generates the control points 110, 112.

As mentioned above, the stylized mesh deformation system generates a modified mesh based on input relative to one or more control points. For example, the stylized mesh deformation system receives input indicating a movement of the control point 110 from a first location 110a (shown in FIG. 1B) to a second location 110b (shown in FIG. 1C). In relation to the embodiment of FIG. 1, the user input comprises a select event and drag event (e.g., a mouse-click and drag event or a touchscreen touch and drag event).

As illustrated, in FIG. 1C, in response to the user input moving the control point 110 to the second location 110b, the stylized mesh deformation system generates the modified mesh 114. As used herein, the term "modified mesh" refers to an altered mesh. In particular, the term "modified mesh" includes a mesh generated by combining one or more input meshes. Similarly, the term "modified mesh" includes a mesh that has been deformed. For instance, the term "modified mesh" includes a mesh with vertices that have been translated and/or rotated. For example, the modified mesh 114 reflects a combination of one or more of the input meshes 102a-102e (and reflects a configuration of vertices different from any one of the input meshes 102a-102e) where the vertices have been translated and rotated to satisfy one or more constraints (e.g., the control points 110, 112). Thus, the stylized mesh deformation system uses the input meshes 102a-102e to generate the modified mesh 114. More particularly, the stylized mesh deformation system determines weights corresponding to the input meshes 102a-102e and combines the input meshes according to the weights to generate the modified mesh 114.

Specifically, the stylized mesh deformation determines the weights for combining the input meshes 102a-102e by utilizing a combined shape-space, deformation interpolation measure. As explained in greater detail below, the stylized mesh deformation system determines the combined shape-space, deformation interpolation measure based on a weighted (i.e., interpolated) measure of deformation of each of the input meshes 102a-102e and a blended shape from a shape space defined by the input meshes 102a-102e. In this manner, the stylized mesh deformation system selects weights to combine and deform the input meshes 102a-102e to satisfy input constraints (e.g., the location of the control points 110, 112) and generate the modified mesh 114.

As mentioned above, the stylized mesh deformation system can generate modified meshes by variably combining input meshes across a digital model. Thus, for example, as shown in FIG. 1C the stylized mesh deformation system not only combines input meshes, but utilizes multiple combinations of the input meshes 102a-102e to generate different portions of the modified mesh 114. To illustrate, the stylized mesh deformation system utilizes a first combination of the input shapes 102d and 102e to generate the tail portion 116c of the modified mesh 114 (e.g., combines vertices from the tail portion 116a from the input shape 102d and vertices from the tail portion 116b from the input shape 102e based on a first set of weights to generate the tail portion 116c). Similarly, the stylized mesh deformation system utilizes a second combination of the input shapes 102a and 102c to generate the neck portion 118c of the modified mesh 114 (e.g., combines vertices from the neck portion 118a of the input shape 102a and the neck portion 118b of the input shape 102c based on a second set of weights to generate the neck portion 118c). In this manner, the stylized mesh deformation system can generate a variety of expressive, unique modified meshes from a small set of input meshes.

Indeed, in addition to the modified mesh 114, the stylized mesh deformation system can generate a variety of additional modified meshes based on modification of the control points 110, 112. For instance, as a user modifies location of the control points 110, 112 the stylized mesh deformation system can generate additional modified meshes by combining the input meshes 102a-102e. Accordingly, based on simple inputs, the stylized mesh deformation system can generate complex digital animations of a snake slithering, coiling, stretching, and otherwise moving.

Indeed, the stylized mesh deformation system can generate a digital animation that smoothly transitions between modified meshes, incorporates all of the input meshes 102a-102e intuitively, and provides added expressiveness by allowing the input meshes 102a-102e to be utilized in a way that spatially varies smoothly across the resulting modified meshes. Moreover, the stylized mesh deformation system is fast enough to run in real time, which allows for rich and detailed deformations to be created from a small set of input shapes, and gives an easy way for set of sketches to be brought to life (through animation or other manipulation) with simple user inputs.

As mentioned above, in one or more embodiments, the stylized mesh deformation system generates modified meshes by utilizing a combined shape-space, deformation interpolation measure. In particular, the stylized mesh deformation system can utilize a combined shape-space, deformation interpolation measure to determine weights to apply to any given input shape in generating a modified mesh. As used herein, the term "combined shape-space, deformation interpolation measure" refers to a joint quantification of a shape-space deformation measure and an input mesh deformation interpolation measure. For example, the combined shape-space, deformation interpolation measure includes a measure of energy (e.g., an elastic energy) to generate a modified mesh from a plurality of input meshes based on a shape-space deformation measure and an input mesh deformation interpolation measure. As discussed in greater detail below, a combined shape-space, deformation interpolation measure can include an as-rigid-as-possible-deformation measure (i.e., an ARAP combined shape-space, deformation interpolation measure where the combined shape-space, deformation interpolation measure rests on an as-rigid-as-possible-deformation rather than some other measure of deformation/energy).

As used herein, the term "shape-space deformation measure" refers to a quantification of the amount of deformation of all or a portion of a blended mesh generated from input meshes. In particular, the term "shape-space deformation measure" includes an amount of deformation of all or a portion of a mesh generated by a blending algorithm that blends input shapes within a shape space according to one or more weights. More specifically, a shape-space deformation measure includes an amount of deformation of a blended mesh generated by a blending algorithm to satisfy on or more constraints. For example, the term "shape-space deformation measure" includes a measure of energy (e.g., elastic energy) to modify (all or a portion of) a blended mesh to satisfy one or more constraints defined by control points. As discussed in greater detail below, a shape-space deformation measure can also include an as-rigid-as-possible-deformation measure (i.e., an ARAP combined shape-space, deformation interpolation measure where the shape-space deformation rests on an as-rigid-as-possible deformation as opposed to some other measure of deformation/energy). Additional information regarding a shape-space deformation measure is provided below.

As used herein, the term "input mesh deformation interpolation measure" refers to a weighted quantification of deformation of all or a portion of vertices in a plurality input meshes. In particular, the term "input mesh deformation measure" includes a product of the amount of deformation of all or a portion of vertices in input meshes and one or more weights. For example, the term "input mesh deformation interpolation measure" includes a measure of energy (e.g., elastic energy) to modify each input mush to satisfy one or more constraints (e.g., control points) weighted (i.e., interpolated) according to the amount of contribution of each input mush to a resulting modified mesh. As discussed in greater detail below, an input mesh deformation interpolation measure can also include an as-rigid-as-possible-deformation measure (i.e., an ARAP input mesh deformation interpolation measure where the input mesh deformation interpolation measure rests on an as-rigid-as-possible deformation as opposed to some other measure of deformation/energy). Additional information regarding an input mesh deformation interpolation measure is provided below.

Figure 2B:
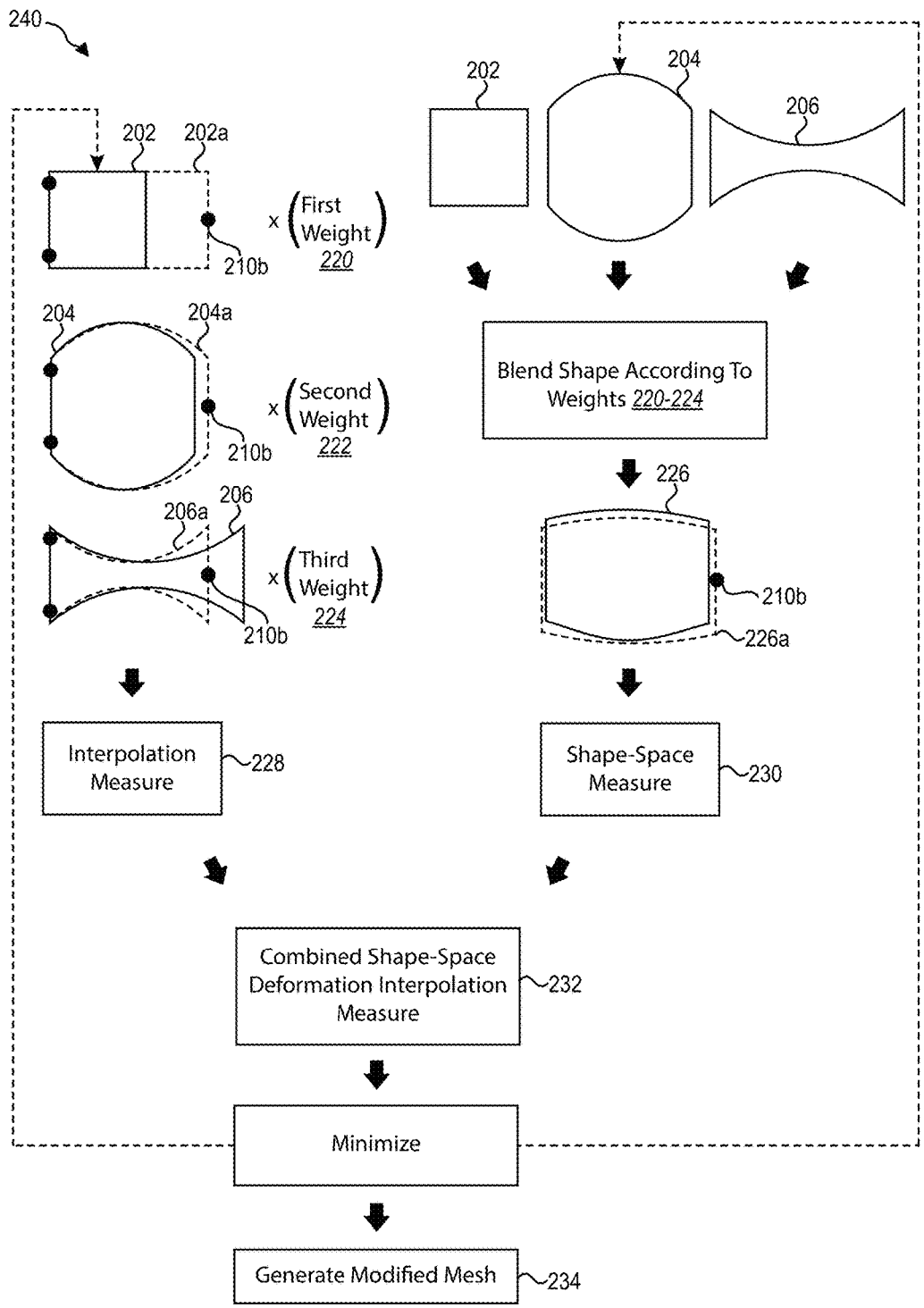
FIG. 2B illustrates a representation of generating a modified mesh based on a combined shape-space, deformation interpolation measure applied to a plurality of input meshes in accordance with one or more embodiments.

For example, FIGS. 2A-2B illustrate utilizing a combined shape-space, deformation interpolation measure to generate a modified mesh in accordance with one or more embodiments. Specifically, FIG. 2A illustrates a first input mesh 202, a second input mesh 204, and a third input mesh 206. The stylized mesh deformation system utilizes the input meshes 202-206 to generate the plurality of meshes 212a-212l based on a combined shape-space, deformation interpolation measure.

As shown, each of the input meshes 202-206 reflect different configurations of a common digital model defined by a set of vertices. Accordingly, each of the input meshes 202-206 comprise a plurality of common vertices in different arrangements. Moreover, each of the input meshes 202-206 comprises vertices associated with a first control point 208a, a second control point 208b, and a third control point 208c. As shown, the distance between the first control point 208a and the second and third control points 208b, 208c increases for each of the input meshes 202-206, respectively. Thus, a user would anticipate that dragging the control point 208a from left to right would generate deformed meshes that transition from the first input mesh 202 to the second input mesh 204 (e.g., start as a square and then bulge out) and then transition from the second input mesh 204 to the third input mesh 206 (e.g., stop bulging out and stretch out).

Indeed, FIG. 2A illustrates a user moving the first control point 208a from a first position 210a through a plurality of new positions 210b-210l before returning to the position 210a. Moreover, FIG. 2A illustrates that, in response, the stylized mesh deformation system generates an initial mesh 212a corresponding to the first position 210a and then generates modified meshes 212b-212l corresponding to the plurality of new positions 210b-210l.

As shown, the stylized mesh deformation system generates modified meshes that smoothly and gradually transition between the input meshes 202-206. In particular, the stylized mesh deformation system gradually combines the input meshes 202-206 to generate the modified meshes 212b-212l. For instance, the modified mesh 212b is a combination of the first input mesh 202 and the second input mesh 204 (i.e., a combination that is deformed to meet the constraint defined by the control points 208a-208c). Similarly, the modified mesh 212f is a combination of the second input mesh 204 and the third input mesh 206.

The stylized mesh deformation system achieves this smooth transformation in relation to FIG. 2A by utilizing a combined shape-space, deformation interpolation measure. In particular, the stylized mesh deformation system minimizes a combined shape-space, deformation interpolation measure to encourage a smooth transition between input meshes. Specifically, the combined shape-space, deformation interpolation measure assists in allowing the stylized mesh deformation system to select weights for combining the input meshes 202-206. Indeed, FIG. 2A illustrates a graph 214 of the amount of contribution from the input meshes 202-206 (i.e., weights applied to the input shapes to generate a modified mesh) as the first control point 208a changes location. As shown, the modified meshes are initially generated based on the first input mesh 202. As the first control point 208a moves to the right, the stylized mesh deformation system smoothly decreases the weight applied to the first input mesh 202 and increases the weight applied to the second input mesh 204. In this manner, the stylized mesh deformation system modifies weights applicable to the input meshes 202-206 and deforms the resulting shape to match the criteria mandated by the control points 208a-208c.

FIG. 2B provides additional detail regarding determining a combined shape-space, deformation interpolation measure and generating a modified mesh in accordance with one or more embodiments. In particular, in one or more embodiments, the acts illustrated in relation to FIG. 2B may be performed as a step 240 for generating a modified mesh from a plurality of input meshes with a control point at a new location based on a combined shape-space, deformation interpolation measure.

In relation to FIG. 2B, the stylized mesh deformation system receives user input comprising an indication of a movement of the first control point 208a to a new position (the location 210b). In response, as shown in FIG. 2B, the stylized mesh deformation system determines an input mesh deformation interpolation measure 228 based on a set of weights 220-224. Moreover, the stylized mesh deformation system determines a shape-space deformation measure 230 based on the set of weights 220-224. The stylized mesh deformation system utilizes the input mesh deformation interpolation measure 228 and the shape-space deformation measure 230 to determine a combined shape-space, deformation interpolation measure 232. Moreover, the stylized mesh deformation system then generates a modified mesh 234 by minimizing the combined shape-space, deformation interpolation measure 232.

As shown, the stylized mesh deformation system determines the input mesh deformation interpolation measure 228 based on an amount of deformation of each input mesh 202-206 and corresponding weights 220-224. In particular, the stylized mesh deformation system generates a first deformed mesh 202a based on the first input mesh 202, a second deformed mesh 204a based on the second input mesh 204, and a third deformed mesh 206a based on the third input mesh 206. More specifically, the stylized mesh deformation system generates the deformed meshes 202a-206a by determining the minimum amount of elastic energy to deform the input meshes 202-206 to include the new location 210b of the first control point 208a.

For example, the stylized mesh deformation system generates the deformed mesh 202a by deforming the first input mesh 202 to reflect the new location 210b of the first control point 208a. The stylized mesh deformation system determines an amount of energy required to deform the first input mesh 202 to reflect the new location 210b of the first control point 208a. Moreover, the stylized mesh deformation system modifies the deformations to reduce (i.e., minimize) the amount of elastic energy required to deform the input shape. By minimizing the measure of deformation (e.g., the elastic energy), the stylized mesh deformation system generates the deformed mesh 202a. Similarly, the stylized mesh deformation system generates the deformed meshes 204a, 206a from the input meshes 204, 206.

As illustrated in FIG. 2B, the stylized mesh deformation system then interpolates between the deformation measures of each input mesh 202-206 to generate the input mesh deformation interpolation measure 228. In particular, as shown, the stylized mesh deformation system interpolates by applying a set of weights 220-224 to each of the input meshes 202-206. More specifically, the stylized mesh deformation system applies a set of weights 220-224 to the measure of deformation (e.g., the measure of energy) required to generate the deformed meshes 202a-206a.

Thus, for example, the stylized mesh deformation system determines an amount of elastic energy (i.e., a measure of deformation) required to deform the first input mesh 202 to the deformed mesh 202a and sets the first weight 220 based on the determined amount of elastic energy. Similarly, the stylized mesh deformation system sets the weights 222-224 based on an amount of deformation required to generate the deformed meshes 204a-206a. Moreover, the stylized mesh deformation system adds the totals together (i.e., the sum of the products of each measure of deformation and the associated weights corresponding to each input shape) to determine the input mesh deformation interpolation measure 228.

In one or more embodiments, the stylized mesh deformation system places constraints on the weights 220-224. In particular, in one or more embodiments, the stylized mesh deformation system constrains the weights 220-224 so that the weights are co-dependent (i.e., if one goes up, another weight must go down) and do not apply a negative contribution to an input shape. For example, in one or more embodiments, the stylized mesh deformation system defines the weights 220-224 such that they must be positive and sum to one (or some other set value). Thus, in one or more embodiments, the weights 220-224 reflect a relative contribution of each input mesh 202-206 to the modified mesh 234.

As shown in FIG. 2B, the stylized mesh deformation system also generates a shape-space deformation measure 230. In particular, the stylized mesh deformation system generates the shape-space deformation measure 230 by blending the input meshes 202-206. Specifically, the stylized mesh deformation system blends the input meshes 202-206 according to the set of weights 220-224 to generate a blended mesh 226.

The stylized mesh deformation system generates the blended mesh 226 by applying a blending algorithm. In particular, the stylized mesh deformation system can utilize a shape-space blending algorithm. A shape-space blending algorithm can blend a plurality of input shapes (i.e., input meshes) to generate a deformed shape (i.e., a deformed mesh). Specifically, a shape-space blending algorithm can determine a shape space defined by input meshes. The shape space is a reflection of all the different meshes that could result from a combination of the input meshes. A blended mesh within the shape space, is, thus, a blended shape that is a combination of the input meshes according to a set of weights.

The stylized mesh deformation system can utilize a variety of shape-space blending algorithms. For example, the stylized mesh deformation system utilizes linear shape-space blending algorithms or non-linear shape-space blending algorithms. To illustrate, in one or more embodiments, the stylized mesh deformation system utilizes a nonlinear blending algorithm as described in Schumacher, C., Thomaszewski, B., Coros, S., Martin, S., Sumner, R., & Gross, M., Efficient Simulation of Example-Based Materials, Proceedings of the ACM SIG-GRAPH/Eurographics Symposium on Computer Animation, Eurographics Association, Aerie-la-Ville, Switzerland, SCA '12, 1-8 (2012) (hereinafter "Schumacher 2012") hereby incorporated by reference in its entirety. Similarly, in one or more embodiments, the stylized mesh deformation system utilizes a linear blending algorithm as described by Sumner, R. W., Zwicker, M., Gotsman, C., & Popovic, J., Mesh-Based Inverse Kinematics, ACM SIGGRAPH 2005 Papers, ACM, New York, N.Y., USA, SIGGRAPH '05, 488-495 (2005) hereby incorporated by reference in its entirety.

As shown in FIG. 2B, the stylized mesh deformation system generates a blended shape according to the set of weights 220-224. Moreover, upon generating the blended mesh 226, the stylized mesh deformation system also determines an amount of deformation of the blended mesh 226 to generate a modified mesh 226a that satisfies one or more constraints. Specifically, the stylized mesh deformation system determines an amount of elastic energy (e.g., a minimum amount of elastic energy) to deform the blended shape 226 to generate the modified mesh 226a such that the first control point 208a is located in the new location 210b. The stylized mesh deformation system utilizes the amount of elastic energy as the space-shape deformation measure 230.

Accordingly, as shown in FIG. 2B, the stylized mesh deformation system utilizes the set of weights 220-224 to determine the input mesh deformation interpolation measure 228 and to determine the shape-space deformation measure 230. Moreover, modification of the weights 220-224 impacts the input mesh deformation interpolation measure 228 and the shape-space deformation measure 230. Indeed, the set of weights 220-224 increases the input mesh deformation interpolation measure 228 where the weights emphasize input meshes that require a large amount of deformation to satisfy constraints (i.e., to ensure the first control point 208a is at the new location 210b). Similarly, the set of weights 220-224 decrease the input mesh deformation interpolation measure 228 where the weights emphasize input meshes that require a smaller amount of deformation to satisfy constraints.

In relation to the shape-space deformation measure 230, the set of weights 220-224 increase the shape-space deformation measure 230 where the weights produce a blended mesh that requires significant deformation to satisfy constraints (e.g., to deform the blended mesh 226 into the modified mesh 226a with the first control point 208a at the new location 210b). Moreover, the weights 220-224 reduce the shape-space deformation measure 230 by generating a blended shape that requires minimal deformation (e.g., by selecting weights that result in blended shape close to the modified mesh 226a with the first control point 208a at the new location 210b).

Moreover, as shown, the stylized mesh deformation system can generate the combined shape-space, deformation interpolation measure 232 based on the input mesh deformation interpolation measure 228 and the shape-space deformation measure 230. For instance, in one or more embodiments, the stylized mesh deformation system generates the combined shape-space, deformation interpolation measure 232 by summing the input mesh deformation interpolation measure 228 and the shape-space deformation measure 230.

As shown in FIG. 2B, the stylized mesh deformation system can also minimize (or reduce or optimize) the combined shape-space, deformation interpolation measure 232. Specifically, the stylized mesh deformation system can modify the set of weights 220-224 (and the locations of vertices in the modified mesh 226a) to minimize the combined shape-space, deformation interpolation measure 232.

Minimizing the combined shape-space, deformation interpolation measure 232 can also be viewed as jointly minimizing the input mesh deformation interpolation measure 228 and the shape-space deformation measure 230. Indeed, minimizing the combined shape-space, deformation interpolation measure 232 results in modifying the set of weights 220-224 to emphasize input meshes that require little deformation to satisfy input constraints and that, when combined, require little deformation to satisfy input constraints.

As shown, upon optimizing the combined shape-space, deformation interpolation measure 232, the stylized mesh deformation system can generate the modified mesh 234. Specifically, the stylized mesh deformation system can blend the input shapes according to the optimized weights and deform the blended shape in accordance with the location of the control points 208a-208c. Indeed, in one or more embodiments, upon optimization of the set of weights 220-224, the stylized mesh deformation system utilizes the modified mesh 226a as the modified mesh 234.

Although FIG. 2B illustrates generating the modified mesh 234 corresponding to the location 210b of the first control point 208a, the stylized mesh deformation system can generate a modified mesh corresponding to any location of any of the control points 208a-208c. Indeed, the stylized mesh deformation system can generate a plurality of modified meshes corresponding to a plurality of new locations as a user changes the location of the first control point 208a (or the control points 208b, 208c). In one or more embodiments, for example, the stylized mesh deformation system generates a real-time animation of modified meshes corresponding to modified positions of control points (e.g., an animation comprising the modified meshes 212b-212l).

As shown in FIGS. 2A-2B, the stylized mesh deformation system can operate in conjunction with non-physical shapes or simulated physical shapes. Indeed, the modified meshes 212b-212l are non-physical (i.e., do not behave according to a physical simulation of stretching a material). To illustrate, upon stretching the first control point 208a, a physical deformation would not generally cause the first input mesh 202 to bulge at the top and bottom. Rather, the stylized mesh deformation system allows users to generate such non-physical deformations based on a user's artistic preference. Moreover, the stylized mesh deformation system smoothly transition between the input meshes without a plurality of parameters to assist in defining physical transformations.

In addition to the description above, the stylized mesh deformation system can also be described in terms of equations and/or pseudocode implemented by a computing device to generate an enhanced digital mesh. For example, in one or more embodiments, the stylized mesh deformation system defines input as a set $\mathcal{S}$ of input meshes (e.g., the input meshes 202-206). Each of these input meshes describe an example rest shape for some digital model (e.g., an object). These input meshes have the same vertex set $\mathcal{P}$ (e.g., a common plurality of vertices), and the same triangle set, so they only differ in the positions of their vertices. In one or more embodiments, the shape of the sth input mesh, denoted by $p_s$, is represented with a one-dimensional array of length $|\mathcal{P}|$, each element of which is a k-dimensional vector describing the position of a single vertex, where k is either two or three depending on the dimension of the space the mesh is embedded in. In one or more embodiments, all of the $p_s$ example meshes are collected together into a single $|\mathcal{S}|\times|\mathcal{P}|$ array denoted P, where each element of P is a k-dimensional vector, rather than a single scalar.

In one or more embodiments, the stylized mesh deformation system allows a user to manipulate a mesh by controlling a set $\mathcal{H}$ of handles (e.g., the control points 208a-208c). Each handle is associated with a subset of the vertices of the mesh. The stylized mesh deformation system can determine a modified mesh q by the user specifying the position of each handle, from which the positions of the remaining vertices are determined automatically. For any particular setting of the desired positions of each handle in $\mathcal{H}$, the stylized mesh deformation system can define an associated constraint set $\mathcal{C}$ such that $q \in \mathcal{C}$ if and only if each handle in q is located at its desired position.

As discussed above, the stylized mesh deformation system determines the modified mesh q by minimizing a combined shape-space, deformation interpolation measure. In one or more embodiments, the stylized mesh deformation system defines q is an array of length $|\mathcal{P}|$, each element of which is a k-dimensional vector describing the position of a single vertex in the enhanced mesh. Furthermore, the stylized mesh deformation system defines P as an array combining the vertex positions of all of the $p_s$ input meshes and b as a length-$|\mathcal{S}|$ array of scalars such that $b_s$, gives the degree contribution for the input mesh $p_s$ to q (e.g., b defines the set of weights 220-224). In one or more embodiments, the stylized mesh deformation system further enforces that b is nonnegative and sums to one.

The general form of the optimization equation used to solve for an example-based mesh deformation as applied to the context of mesh-based inverse kinematics can then be written:

$$q_{opt}, b_{opt} = \arg\min_{q \in C, b} E(q, P, b) \quad \text{Equation (1)}$$

The stylized mesh deformation system utilizes a definition for E that provides fast and reliable mesh-based inverse kinematics. It is tempting to view this problem as either a trivial generalization of mesh interpolation, or a trivial restriction of example-based elastic material simulation. As mentioned above, however, there are difficulties specific to mesh inverse kinematics that do not appear in either of these two contexts. Indeed, as mentioned above, applying conventional mesh interpolation or elastic material simulation approaches results in a variety of different artifacts in mesh-based inverse kinematics.

In one or more embodiments, the stylized mesh deformation system utilizes a combined shape-space, deformation interpolation energy which, when minimized subject to inverse kinematic constraints, interpolates efficiently and reliably between a set of example meshes, even for highly stylized input meshes and exaggerated deformations. In particular the stylized mesh deformation system constructs an example-based plastic energy E(q, P, b) (i.e., a combined shape-space, deformation interpolation measure) by modifying a non-example-based energy $E_d$(q, p). The vertex positions in the enhanced mesh q are generated by minimizing E subject to user-specified constraints enforcing that $q \in \mathcal{C}$, where $\mathcal{C}$ represents the subset of deformations in which the handles are correctly located at their user-specific positions.

As mentioned above, one function of the elastic energy E is to interpolate between the input shapes as the user-specified constraint set C changes (e.g., as the user clicks and drags the handles). Accordingly, the stylized mesh deformation system defines E in such as way so as to satisfy a number of properties. Specifically:

Property 1. If $b_s$=0, then E(q, P, b) is independent of $p_s$.

Property 2. When b is entirely zero except for $b_s$=1, then E(q, P, b)=$E_d$(q, $p_s$). As a consequence, E reduces to $E_d$ when there is only one example mesh.

Property 3. E should inherit any symmetries of $E_d$. For example, if $E_d$ is invariant to rigid transformations, then E should be too.

In addition, as described above, there are at least two classes of artifacts that the stylized mesh deformation system can help avoid. First, small changes in the handle positions should not lead to discontinuous changes in the result. Second, combinations of similar shapes are preferred over combinations of disparate shapes. Accordingly:

Property 4. In practice, the vector $$q_{opt} = \arg\min_{q \in C, b} E(q, P, b)$$

should vary $\mathcal{C}^0$ continuously with respect to $\mathcal{C}$.

Property 5. Given some enhanced mesh q and defining $$b_{opt} = \arg\min_{q \in C, b} E(q, P, b),$$

then $b_{opt}$ should typically be zero at entries corresponding to input shapes which are dissimilar from q. Relatedly, $\min_b E$(q, P, b) should be zero if and only if q=$p_s$ for some s (up to the symmetries of E).

Moreover, to mitigate the effects of local minima, the stylized mesh deformation system also ensures that:

Property 6. If $E_d$ is convex, then so is E.

This last point has a small subtlety that is worth noting. The stylized mesh deformation system can require not only that a convex $E_d$ lead to a convex E, but also that E does not depend on the nonconvexity or nonlinearity of $E_d$ in order to satisfy the above-listed properties 1-5. This is in contrast to some conventional systems, which give either a convex optimization or prefer interpolating between similar input shapes, but not both.

No conventional approach satisfies all of these properties. Moreover, as described above, the failure to satisfy these properties leads to noticeable artifacts when applied to stylized mesh-based inverse kinematics. The stylized mesh deformation system provides example-based deformations that satisfy the above six properties by employing a novel method for generalizing non-example-based energy to a combined shape-space, deformation interpolation measure.

Indeed, as described above, in one or more embodiments, the stylized mesh deformation system calculates a shape-space deformation measure that relies on a non-example-based elastic energy $E_d$ applied to an interpolation of input shapes (or features computed from the input shapes). Using blend(P, b) (e.g., shape-space blending algorithm) to denote a function which combines the $p_i, \ldots, p_{|S|}$ input meshes using b as a vector of interpolation weights, the elastic energy applied to the blended input shape can be expressed as:

$$E(q, P, b) = E_d(q, \text{blend}(P, b)) \qquad \text{Equation (2)}$$

In addition, as described above, in one or more embodiments, the stylized mesh deformation system can define E by interpolating between the values of a non-example-based elastic energy $E_d$ as applied to each $p_s$ shape independently. This results in an input shape deformation interpolation measure, as follows:

$$E(q, P, b) = \Sigma_s^{|S|} b_s E_d(q, p_s) \qquad \text{Equation (3)}$$

To satisfy the six properties describe above, the stylized mesh deformation system generates a combined shape-space, deformation interpolation measure. Specifically, in one or more embodiments, the stylized mesh deformation system calculates a set of $|S|$ scalar constants $d_1, \ldots, d_{|S|}$ as:

$$d_s = \min_{q_s \in C} E_d(q_s, p_s) \qquad \text{Equation (4)}$$

Here, $q_s$ is used instead of q to indicate that a modified mesh is computed independently for each $d_s$. In other words, the stylized mesh deformation system calculates a minimum energy required to deform each input mesh to a modified mesh that would satisfy the user-provided constraints (e.g., the minimum energy required to generate the deformed meshes 202a-206a for each input mesh 202-206). The stylized mesh deformation system collects the $d_s$ values into a single length-$|S|$ vector d. The stylized mesh deformation system then defines the combined shape-space, deformation interpolation measure as:

$$E(q, P, b) = E_d(q, \text{blend}(P, b)) + \lambda d^T b$$

Specifically, the first term reflects a shape-space deformation energy and the second term reflects an input shape deformation interpolation measure. Combined (i.e., summed) they reflect a combined shape-space, deformation interpolation measure. Moreover, the stylized mesh deformation system can define the optimization to solve for q as:

$$\arg\min_{q \in C, b} E_d(q, \text{blend}(P, b)) + \lambda d^T b \qquad \text{Equation (5)}$$

$$\text{s.t.} \sum_s^{|S|} b_s = 1$$

$$0 \leq b_s, 1 \leq s \leq |S|$$

where $\lambda$ is a pre-specified scalar (e.g., set to 0.5). Specifically, the stylized mesh deformation system minimizes the combined shape-space, deformation interpolation measure by modifying b to solve for a modified mesh q (e.g., can minimize the combined shape-space, deformation interpolation measure 232 to generate the modified mesh 234). Note that the value of each $d_s$, only depends on $p_s$ (e.g., only depends on each deformed mesh 202a-206a) and $C$ so in practice, they are recomputed once each time the user moves a handle.

The optimization of equation 5 can be interpreted in several different ways. For example, the optimization can be viewed as a weighted-$L_1$ regularization applied to the shape space distance $E_d(q, \text{blend}(P, b))$, where the weights in the regularization are themselves defined by minimizing $E_d$. Alternatively, this optimization can be viewed as taking an energy interpolation formulation from multiple input meshes and using a distance-from-subspace term $E_d(q, \text{blend}(P, b))$ to smooth out the discontinuous transitions. Similarly, it can be viewed as a shape-space combination, where the contributing shapes are weighted (penalized) based on the amount of deformation required to form the resulting deformed shape. Accordingly, the stylized mesh deformation system encourages blending shapes that require little deformation to form the resulting modified mesh.

As mentioned above, the stylized mesh deformation system can also utilize an as-rigid-as-possible-deformation measure to generate a modified shape from a plurality of input shapes. As used herein, the term "as-rigid-as-possible-deformation measure" (or "ARAP") refers to a measure of local deviation from rigidity. In particular, an "as-rigid-as-possible-deformation measure" refers to distortion of a modified mesh with respect to an input mesh as a sum of local deviations from perfect rigidity. Thus, the term "as-rigid-as-possible-deformation measure" includes a measure of deviation from perfect rigidity between adjacent vertices (or adjacent groups of vertices, such as edge groups) in generating a modified mesh. For example, the term "as-rigid-as-possible-deformation measure" includes a measure of translation and/or rotation of vertices (or edge groups) in a modified mesh from perfect rigidity relative to adjacent vertices (or edge groups) in the mesh.

An as-rigid-as-possible-deformation measure can include a combined shape-space, deformation interpolation measure. For instance, in one or more embodiments, the stylized mesh deformation system can generate a combined shape-space, deformation interpolation measure that rests on an as-rigid-as-possible-deformation measure (i.e., an ARAP combined shape-space, deformation interpolation measure). This approach inherits many of the desirable properties of as-rigid-as-possible-deformations, such as invariance to rigid transformations and minimization of scale and shear distortions. Moreover, this approach can robustly and smoothly interpolate between the input shapes. In addition, this approach also supports spatially localized changes in how the different shapes are combined.

Although computationally efficient, this approach can also be more conceptually complex. Indeed, because as-rigid-as-possible-deformation measures analyze local rigidity, in utilizing an as-rigid-as-possible-deformation measure the stylized mesh deformation system analyzes localized translations and/or rotations. Furthermore, in combining input shapes to generate a deformed mesh, the stylized mesh deformation system can vary combinations of different input shapes over different portions of a modified mesh. Thus, in one or more embodiments, the stylized mesh deformation system not only determines weights globally applicable to each input mesh, but weights for combining individual portions of each input mesh in forming a modified mesh.

Figure 3:
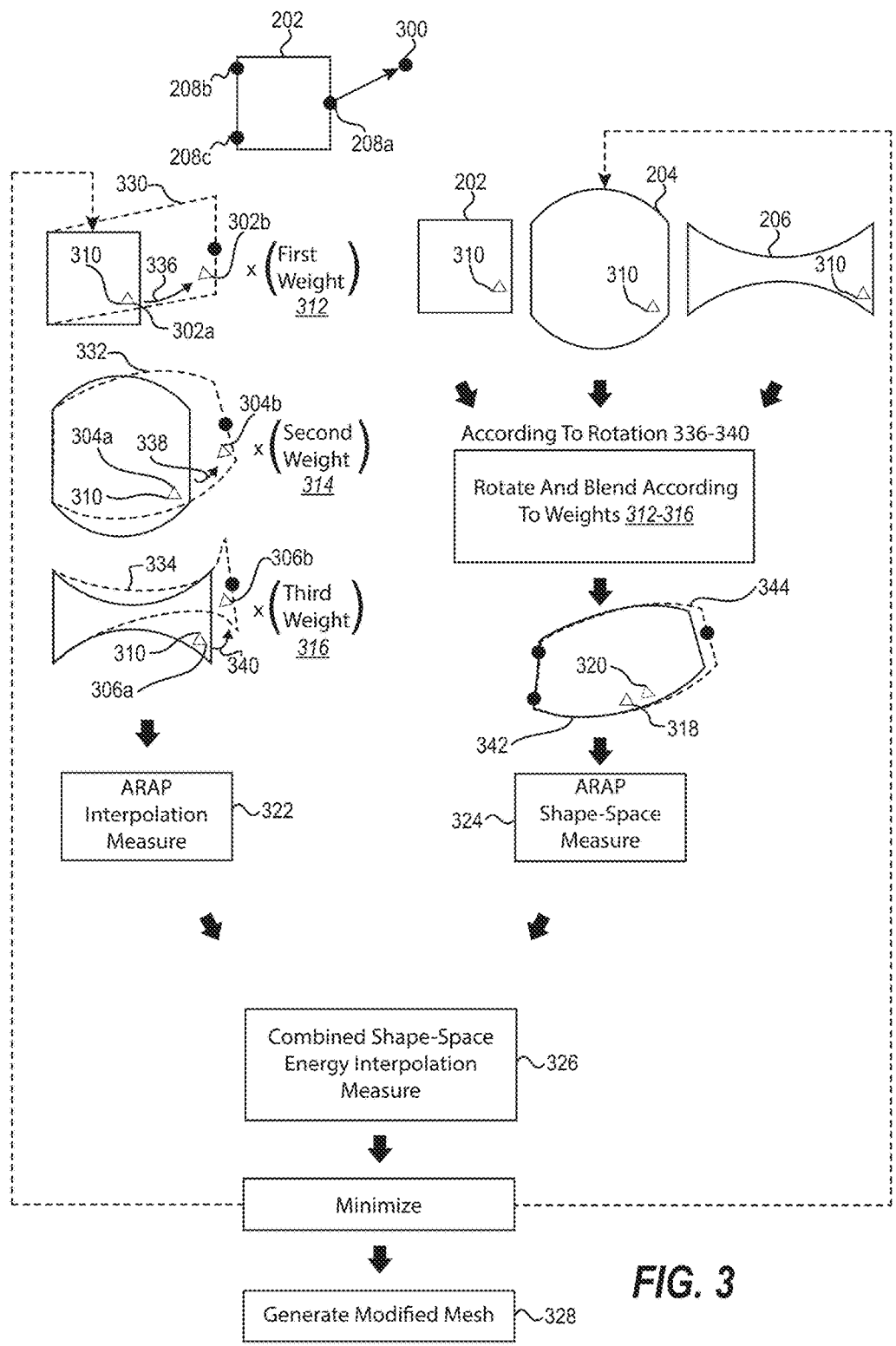
FIG. 3 illustrates a representation of generating a modified mesh based on an as-rigid-as-possible-deformation measure in accordance with one or more embodiments.

For example, FIG. 3 illustrates generating a deformed mesh by combining a plurality of input meshes utilizing an as-rigid-as-possible-deformation measure. In particular, FIG. 3 illustrates utilizing an ARAP combined shape-space, deformation interpolation measure 326 to generate a modified mesh 328. In relation to the embodiment of FIG. 3 the stylized mesh deformation system identifies the input meshes 202-206, and corresponding control points 208a-208c. Moreover, as shown, the stylized mesh deformation system receives user input indicating movement of the first control point 208a to a new position 300. In response, the stylized mesh deformation system generates an ARAP input mesh deformation interpolation measure 322 (i.e., an input mesh deformation interpolation measure resting on as-rigid-as-possible-deformation measure) and an ARAP shape-space deformation measure 324 (i.e., a shape space deformation measure resting on as-rigid-as-possible deformation measure). Moreover, the stylized mesh deformation system generates the ARAP combined shape-space, deformation interpolation measure 326 based on the ARAP input mesh deformation interpolation measure 322 and the ARAP shape-space deformation measure 324 and minimizes the ARAP combined shape-space, deformation interpolation measure 326 to generate the modified mesh 328.

As mentioned above, because as-rigid-as-possible-deformation measures analyze local deviations from rigidity, the ARAP input mesh deformation interpolation measure 322 and the ARAP shape-space deformation measure 324 also analyze localized vertices or edge groups. For example, as shown in FIG. 3, the stylized mesh deformation system generates the ARAP input mesh deformation interpolation measure 322 based on a deviation from rigidity of an individual edge group 310 in the input meshes 202-206.

As used herein, the term "edge group" refers to a plurality of vertices. In particular, the term "edge group" includes a plurality of local vertices of a mesh connected by one or more edges. In one or more embodiments, the stylized mesh deformation system determines clusters similar vertices of a mesh into edge groups (e.g., based on a k-means clustering algorithm) and analyzes the edge groups (rather than individual vertices) to improve processing speed. That said, the stylized mesh deformation system can analyze either edge groups or vertices, depending on the embodiment.

In particular, as shown in FIG. 3, the stylized mesh deformation system determines the ARAP input mesh deformation interpolation measure 322 based on an amount of translation and rotation of the edge group 310 across input meshes 202-206. Specifically, the stylized mesh deformation system generates deformed meshes 330-334, determines an edge specific as-rigid-as-possible-deformation measure for each shape, and then combines the edge specific as-rigid-as-possible-deformation measure for each shape based on the weights 312-316 to generate the ARAP input mesh deformation interpolation measure 322.

As just mentioned, to generate the ARAP input mesh deformation interpolation measure 322 the stylized mesh deformation system generates the deformed meshes 330-334. In particular, the stylized mesh deformation system generates the deformed meshes 330-334 corresponding to each input mesh 202-206, such that the deformed meshes 330-334 satisfy input constraints (e.g., such that the first control point 208a is located in the position 300). More specifically, the stylized mesh deformation system generates the deformed meshes 330-334 by minimizing an input-shape specific, as-rigid-as-possible-deformation measure. In other words, the stylized mesh deformation system determines the deformed meshes 330-334 by minimizing the total local deviation from rigidity for each input mesh 202-206 while still ensuring that the deformed meshes 330-334 satisfy input constraints reflected by the control points 208a-208c.

For example, in relation to the input mesh 202, the stylized mesh deformation system generates the deformed mesh 330. Specifically, the stylized mesh deformation system generates the deformed mesh 330 by minimizing the total as-rigid-as-possible-deformation measure for the input mesh 202 with the constraint that the first control point 208a is in the position 300. Accordingly, the stylized mesh deformation system analyzes the translation and rotation of each edge group and minimizes the total local deviation from rigidity to generate the deformed mesh 330. The stylized mesh deformation system generates the deformed meshes 332, 334 in a similar manner.

Upon generating the deformed meshes 330-334, the stylized mesh deformation system then determines an edge-specific (or vertex-specific), as-rigid-as-possible-deformation measure. In particular, the stylized mesh deformation system determines the deviation from rigidity (i.e., the translation and rotation relative to adjacent edge groups) corresponding to each edge in each input mesh. Thus, in relation to the first input mesh 202, the stylized mesh deformation system analyzes the edge group 310 and determines a rotation 336 and a translation from a first position 302a to a second position 302b in generating the deformed mesh 330. Moreover, based on the rotation 336 and translation from the first position 302a to the second position 302b, the stylized mesh deformation system determines a corresponding edge-specific, as-rigid-as-possible-deformation measure for the edge group 310 and the first input mesh 202. Similarly, in relation to the second input mesh 204, the stylized mesh deformation system analyzes the edge group 310 and determines a rotation 338 and a translation from first position 304a to the second position 304b (and corresponding edge-specific, as-rigid-as-possible-deformation measure) in generating the deformed mesh 332. In addition, in relation to the third input mesh 206, the stylized mesh deformation system analyzes the edge group 310 and determines a rotation 340 and a translation from the first position 306a to the second position 306b (and corresponding edge-specific, as-rigid-as-possible-deformation measure) in generating the deformed mesh 334.

Upon calculating an edge-specific as-rigid-as-possible-deformation measure for the edge group 310 in relation to each of the input meshes 202-206, the stylized mesh deformation system combines the edge-specific as-rigid-as-possible-deformation measures to generate the ARAP input shape deformation interpolation measure 322. Specifically, as shown in FIG. 3, the stylized mesh deformation system combines the edge-specific as-rigid-as-possible-deformation measure for each input mesh 202-206 by multiplying the edge-specific as-rigid-as-possible-deformation measures by the weights 312-316 and summing the results together.

To illustrate, in relation to the first input mesh 202, the stylized mesh deformation system determines an edge-specific, as-rigid-as-possible-deformation measure for the edge group 310 to generate the deformed mesh 330. Moreover, the stylized mesh deformation system multiplies the edge-specific, as-rigid-as-possible-deformation measure by the first weight 312. In addition, in relation to the second input mesh 204, the stylized mesh deformation system determines an edge-specific, as-rigid-as-possible-deformation measure for the edge group 310 to generate the deformed mesh 332. The stylized mesh deformation system also multiplies the edge-specific as-rigid-as-possible-deformation measure by the second weight 314. Further, in relation to the second input mesh 204, the stylized mesh deformation system determines an edge-specific, as-rigid-as-possible-deformation measure for the edge group 310 to generate the deformed mesh 334 and multiplies the edge-specific, as-rigid-as-possible-deformation measure by the third weight 316. The stylized mesh deformation system then generates the ARAP input mesh deformation interpolation measure 322 by summing the resulting products together.

Thus, the ARAP input mesh deformation interpolation measure 322 reflects an interpolated amount of as-rigid-as-possible-deformation measure for each input mesh 202-206, in relation to localized edge groups within each input mesh 202-206. Specifically, the ARAP input mesh deformation interpolation measure 322 reflects an amount of translation and rotation (from perfect rigidity) of localized edge groups within each input shape in order for each input shape to satisfy input constraints by positioning the first control point 208a in the position 300.

Although FIG. 3 illustrates generating the ARAP input mesh deformation interpolation measure 322 in relation to the edge group 310, the stylized mesh deformation system can generate the ARAP input mesh deformation interpolation measure 322 in relation to all vertices (or edge groups) of the input meshes 202-206. For example, in one or more embodiments, the stylized mesh deformation system iterates through each edge group of the input meshes 202-206, determines an edge-group specific, as-rigid-as-possible-deformation measure for each edge group in relation to each of the input meshes 202-206, and combines the edge-group specific, as-rigid-as-possible-deformation measures of deformation utilizing weights specific to each edge group.

Indeed, in this manner, the stylized mesh deformation system can generate weights not only specific to each input shape, but specific to each edge group within each input shape. By utilizing weights specific to edge group within each shape, the stylized mesh deformation system combines the input shapes differently across different edge groups. For example, the stylized mesh deformation system utilizes a first set of weights for a first edge group and a second set of weights for a second edge group. Thus, the stylized mesh deformation system can make different combinations of different input shapes for different portions of a digital model.

In addition to generating the ARAP input mesh deformation interpolation measure 322, as shown in FIG. 3 the stylized mesh deformation system also generates the ARAP shape-space deformation measure 324. Similar to the ARAP input mesh deformation interpolation measure 322, the stylized mesh deformation system can also generate the ARAP shape-space deformation measure 324 specific to each edge group within the input meshes 202-206.

For instance, as shown in FIG. 3, the stylized mesh deformation system generates the ARAP shape-space deformation measure 324 by rotating and blending the input meshes 202-206. In particular, the stylized mesh deformation system rotates each edge group according to the rotations 336-340. Moreover, the stylized mesh deformation system blends each edge group according to the weights 312-316 to generate a blended mesh 342. The stylized mesh deformation system then determines a deformed mesh 344 that satisfies input constraints (e.g., with the first control point 208a at the position 300). The stylized mesh deformation system then determines the ARAP shape-space deformation measure 324 based on the difference (i.e., an as-rigid-as-possible deformation measure) between edge groups in the blended mesh 342 and edge groups in the deformed mesh 344.

For example, FIG. 3 illustrates generating the ARAP shape-space deformation measure 324 in relation to the edge group 310. As shown, the stylized mesh deformation system first rotates the edge group 310 based on the rotations 336-340. Thus, in relation to the first input mesh 202, the stylized mesh deformation system rotates the edge group 310 by the rotation 336. Similarly, the stylized mesh deformation system rotates the edge group 310 by the rotation 338 in relation to the second input mesh 204 and rotates the edge group 310 by the rotation 340 in relation into the third input mesh 206.

Upon rotating the edge group 310, the stylized mesh deformation system blends the rotated edge group 310 from each input mesh 202-206 according to the weights 312-316. Specifically, the stylized mesh deformation system utilizes a blending algorithm (e.g., a shape-space blending algorithm) to combine the rotated edge group 310 from each input mesh 202-206 to generate a blended edge group 318. Although FIG. 3 only illustrates the edge group 310 and the blended edge group 318, the stylized mesh deformation system can rotate and blend all edge groups in each of the input meshes 202-206. In this manner, the stylized mesh deformation system can generate the blended mesh 342.

Moreover, the stylized mesh deformation system compares individual edges in the blended mesh 342 to the deformed mesh 344. In particular, the stylized mesh deformation system generates the deformed mesh 344 based on the blended mesh 342. Specifically, the stylized mesh deformation system generates the deformed mesh 344 by modifying the blended mesh 342 to satisfy input constraints (e.g., such that the first control point 208a is in the position 300). More specifically, the stylized mesh deformation system generates the deformed shape by modifying the blended mesh 342 so as to minimize an as-rigid-as-possible-deformation measure while satisfying input constraints.

Thus, as shown, the stylized mesh deformation system compares individual edge groups of the blended mesh 342 to corresponding edge groups of the deformed mesh 344. Specifically, the stylized mesh deformation system determines an as-rigid-as-possible-deformation measure between the rotated, blended edge group 318 and the corresponding edge group 320 in the deformed mesh 344. The stylized mesh deformation system then utilizes the as-rigid-as-possible-deformation measure between the blended edge group 318 and the edge group 320 as the ARAP shape-space deformation measure 324.

As mentioned above, although FIG. 3 illustrates generating the ARAP shape-space deformation measure 324 based on the edge group 310, the stylized mesh deformation system can generate the ARAP shape-space deformation measure 324 based on additional edge groups. Indeed, in one or more embodiments, the stylized mesh deformation system generates the ARAP shape-space deformation measure 324 based on an as-rigid-as-possible deformation measure for all edge groups in a digital model (e.g., by summing all edge groups in the input meshes 202-206).

As shown in FIG. 3, the stylized mesh deformation system also combines the ARAP input mesh deformation interpolation measure 322 and the ARAP shape-space deformation measure 324 to generate the ARAP combined shape-space, deformation interpolation measure 326. Thus, the ARAP combined shape-space, deformation interpolation measure 326 reflects the localized ARAP deformation of each input shape based on localized interpolation as well as the localized ARAP deformation after locally blending the input shapes. Reducing this measure thus encourages selection of locally similar input shapes that require minimal ARAP deformation after combination to satisfy input constraints. For example, selecting weights that emphasize input shapes that each require little local deviation from rigidity to satisfy input constraints will reduce the ARAP combined shape-space, deformation interpolation measure 326. Similarly, selecting weights that emphasize input shapes that combine to require little local deviation from rigidity to satisfy input constraints will reduce the ARAP combined shape-space, deformation interpolation measure 326.

Accordingly, as shown in FIG. 3, the stylized mesh deformation system minimizes (or otherwise optimizes or reduces) the ARAP combined shape-space, deformation interpolation measure 326. Specifically, the stylized mesh deformation system can modify the rotations, translations, and weights applied to individual edge groups to minimize the ARAP combined shape-space, deformation interpolation measure 326.

As shown, upon optimizing the ARAP combined shape-space, deformation interpolation measure 326, the stylized mesh deformation system generates the modified mesh 328. Indeed, by determining the rotation, translation, and weights for reducing the ARAP combined shape-space, deformation interpolation measure 326 the stylized mesh deformation system can solve for the modified mesh 328 (e.g., the deformed mesh 344).

In one or more embodiments, the stylized mesh deformation system further reduces processing requirements in generating the modified mesh 328 by utilizing a reduced coordinate model based on linear blend skinning. Linear blend skinning defines how meshes change according to a function of control points. In particular, a linear blend skinning model utilizes skinning weights to describe the amount of influence a control point has on the position of points in a mesh. The stylized mesh deformation system can then utilize the linear blend skinning model as a means to calculate the modified mesh 328 in a computationally efficient manner. Specifically, in one or more embodiments, the stylized mesh deformation system defines the skinning weights and then extends the weights to the rest of a mesh using bounded biharmonic weights, as described in Jacobson, A., Baran, I., Popovic, J., & Sorkine, O., *Bounded Biharmonic Weights For Real-Time Deformation*, ACM Transactions on Graphics (proceedings of ACM SIG_GRAPH) 30, 4, 78:1-78:8 (2011) hereby incorporated by reference in its entirety.

This approach differs from conventional applications of linear blend skinning in that the stylized mesh deformation system determines contribution in relation to both different control points and different shapes. For instance, the stylized mesh deformation system can apply unique weights to a point based both on its vicinity to a particular control point and the contribution of an input mesh in the vicinity of a particular control point. In this manner, the stylized mesh deformation system can increase processing speed and real-time interaction with high-resolution meshes. Additional detail regarding implementation of a linear blend skinning model is provided below.

In addition to the foregoing description, the stylized mesh deformation system can also be described in terms of equations and/or pseudocode implemented by a computing device to generate an enhanced digital mesh utilizing an as-rigid-as-possible-deformation measure. In particular, as mentioned above, the stylized mesh deformation system allows a user to manipulate a mesh by controlling a set of $\mathcal{H}$ handles (i.e., control points). The stylized mesh deformation system can employ a linear blend skinning model where each handle is associated with a per-shape k×k+1-dimensional matrix representing an affine transform for the handle. The stylized mesh deformation system can pack these transforms into an $|\mathcal{H}|\times|\mathcal{S}|$ array T so that the affine transform for the hth handle and sth shape is $T_{hs}$. The position of the complete set of vertices in $\mathcal{P}$ describing a modified mesh is computed from T by linear blend skinning. This uses a $|\mathcal{H}|\times|\mathcal{P}|$ matrix of skinning weights W where $W_{hp}$ gives the amount of influence that the hth handle has on the position of the pth point. These skinning weights can be defined in many ways, including painting by an artist, but in one or more embodiments, the stylized mesh deformation system selects a subset of the vertices in the mesh for each handle, fixes their skinning weights (e.g., to 1), and extends the weights to the rest of the mesh using bounded biharmonic weights. The stylized mesh deformation system can then compute the length-$|\mathcal{P}|$ array of k-dimensional points q giving the shape of the modified mesh as:

$$q_p = \sum_{hs} W_{hp} T_{hs} \begin{bmatrix} P_{sp} \\ 1 \end{bmatrix}$$
$$= \sum_{hs} M_{hsp} T_{hs}^T$$

Equation (6)

where to reduce notational clutter the bounds of the sum (i.e., h=1 ... $|\mathcal{H}|$, s=1 ... $|\mathcal{S}|$) are taken to be implicit from the names of the indices it is summing over. M is a $|\mathcal{H}|\times|\mathcal{S}|\times|\mathcal{P}|$ array of length-k+1 row vectors combining the effect of W and P on q in terms of T.

Although this deformation model is mathematically equivalent to standard linear blend skinning, its interpolation is slightly different since it combines both different handles and different shapes. For instance, scaling a particular $T_{hs}$ by a constant factor increases or decrease the contribution of the sth shape to q in the vicinity of the hth handle. On the other hand, multiplying each $T_{hs}$ by the same rigid transformation for $1 \le s \le |\mathcal{S}|$ has the effect of rigidly transforming the portion of q near the hth handle. Equation 6 thus describes q as a combination of spatially localized geometric transformations and interpolations of the input meshes.

The fact that this deformation is linear contributes to computational efficiency. This simplifies its use in optimizing a combined shape-space, deformation interpolation measure and is useful in allowing the stylized mesh deformation system to run in real time. Although this linear nature means that it is capable of representing highly distorted deformations, the fact that the ARAP combined shape-space, deformation interpolation measure attempts to preserve local rigidity naturally avoids these situations. Researchers have not observed any artifacts resulting from the linearity in practice.

Describing the shape of a modified mesh by manually specifying T is tedious, particularly so when there is more than one shape. The stylized mesh deformation system can instead allow a user to directly manipulate the shape with a simple click-and-drag (or other user input) interface and automatically infer T via an energy minimizing optimization. This leads to both automatic geometric distortions and automatic determination of how much each of the input shapes contributes to the final mesh. Moreover, the stylized mesh deformation system can spatially localize both geometric and shape distortions (e.g., modify geometry of individual triangles and the amount of contribution of each individual shape across a digital mesh).

As mentioned above, in one or more embodiments, the stylized mesh deformation system utilizes an as-rigid-as possible-deformation measure to allow interpolation between a set of shapes. For example, the stylized mesh deformation system generates an ARAP combined shape-space, deformation interpolation measure where the rigidity is measured with respect to the set of input shapes described by $p_1, \ldots, p_{|\mathcal{S}|}$ rather than with respect to a single mesh.

A conventional ARAP energy, denoted $E_{arap}$, measures the distortion of a shape q with respect to a reference shape p by a sum of local deviations from perfect rigidity. With respect to both q and p as an array of size $|\mathcal{P}|$, each element of which is a k-dimensional vector representing the position of a single vertex. This energy can be written:

$$E_{arap} = \qquad\qquad\qquad \text{Equation (7)}$$
$$\frac{1}{2}\sum_g \sum_{(p1,p2)\in\mathcal{G}_g} c_{gp1p2}\|(q_{p2} - q_{p1}) - R_g(p_{p2} - p_{p1})\|^2 =$$
$$\frac{1}{2}\sum_g \sum_{e\in\mathcal{G}_g} c_{ge}\left\|\sum_p A_{ep}q_p - R_g\sum_p A_{ep}p_p\right\|^2 =$$
$$\frac{1}{2}\sum_g E_g(q, R_g, p)$$

where $\mathcal{G}$ is a set of edge groups and g indexes over $1, \ldots, |\mathcal{G}|$. As above, the bounds of the summation are taken to be implicit from the names of the indices being summed over. Further, $R_g \in SO(k)$ is a local rotation matrix associated with the gth edge group, $c_{ge}$ is a weighting term typically calculated with the cotangent Laplacian (as described in Chao, I., Pinkall, U., Sanan, P., and Schroder, P., *A Simple Geometric Model for Elastic Deformations*, ACM Trans. Graph. 29, 4 (July), 38:1-38:6 (2010) hereby incorporated by reference in its entirety), and A is the $|\mathcal{P}|\times|\mathcal{E}|$ (sparse) directed adjacency matrix corresponding to the set $\mathcal{E}$ of edges of the triangular mesh on q. The stylized mesh deformation system can compute $\mathcal{G}$ by performing k-means clustering on W with the number of clusters set to $2|\mathcal{H}|$. This allows the stylized mesh deformation system to use a relatively small number of edge groups and generate real time performance because the support for spatially localized blending includes additional variables and constraints for each edge group (as shown below).

As discussed above, the stylized mesh deformation system can generate an ARAP combined shape-space, deformation interpolation measure by generalizing equation 7 to interpolate between multiple input shapes. Doing so can be more involved than it appears for two reasons. First, in one or more embodiments, the stylized mesh deformation system modifies the blend function for the fact that an ARAP energy explicitly optimizes over a local rotation matrix for each group in $\mathcal{G}$. Second, in relation to embodiments that support spatially localized deformations and interpolations between input meshes, the stylized mesh deformation system further modifies the blend function in order to support interpolations which spatially vary over the mesh.

As mentioned above, in one or more embodiments, the stylized mesh deformation system achieves these modifications by defining local rotation matrices and blend weights both per shape and per edge group. Accordingly, in one or more embodiments, the stylized mesh deformation system represents the collection R of all the local rotations with a $|\mathcal{G}|\times|\mathcal{S}|$ array of k×k rotation matrices (e.g., the rotations 336-340). Similarly, the per-edge-group blend weights for the different $p_1, \ldots, p_{|\mathcal{S}|}$ shapes in P are collected into a $|\mathcal{G}|\times|\mathcal{S}|$ matrix denoted B (e.g., the weights 312-316). The stylized mesh deformation system can define a blending function (e.g., for the ARAP shape-space deformation measure 324) as:

$$[\text{blend}_g(P, B)]_e = \Sigma_{sp} B_{gs} R_{gs} A_{ep} P_{sp} \qquad \text{Equation (8)}$$

To avoid scaling artifacts or negative shape contributions the stylized mesh deformation system can also constrain $\forall g, s: B_{gs}\geq 0$ and $\forall g: B_{gs}=1$. Since $\text{blend}_g(P, B)$ computes a vector of interpolated edge lengths, equation 8 uses the notation $[\text{blend}_g(P, B)]_e$ to refer to a single element corresponding to the eth edge. Moreover, subscript e is used to denote how the element in this vector corresponding to a single edge is defined.

As discussed above, this function can be interpreted as, for the gth edge group and each edge $e \in \mathcal{G}_g$ first rotating the corresponding edge for each shape in $\mathcal{S}$ by $R_{gs}$ (e.g., rotating the edge group 310 from the input meshes 202-206 by the rotations 336-340), then linearly blending the edges for the different shapes together according to the weights given by $B_{gs}$ (e.g., blending the input meshes 202-206 based on the weights 312-316). Because the instances of an edge group within each shape are rotationally aligned and because each edge group relates only to a small localized portion of the complete mesh, the stylized mesh deformation system can avoid the normal artifacts associated with linearly interpolating directly between vertex positions.

Given the definition of the blending function in equation 8, in one or more embodiments, the stylized mesh deformation system utilizes the following equation that incorporates an ARAP energy in a shape-space deformation measure to locally interpolate and rotate the different input shapes (e.g., the ARAP shape-space deformation measure 324).

$$E_d(q, B, R, P) = \tfrac{1}{2}\Sigma_g \Sigma_{e\in\mathcal{G}_g} C_{ge}\|\Sigma_p A_{ep}q_p - \text{blend}_g(P, B)_e\|^2 \qquad \text{Equation (9)}$$

The stylized mesh deformation system can also generate a definition for the analogous d from above. To support spatially varying geometric deformations within an ARAP-style formulation, the stylized mesh deformation system can compute a $|\mathcal{G}|\times|\mathcal{S}|$ matrix D. Each column of this matrix is defined by first solving $$q_s = \arg\min_{q\in C, R} E_{arap}(q, R, p_s)$$

(e.g., solving for the deformed meshes 330-334). The function $E_{arap}$ from above appears instead of $E_d$ because when applied to a single shape $p_s$, $E_d(q, B, R, P)$ reduces exactly to $E_{arap}(q, R, p_s)$.

Accordingly, the ARAP combined shape-space, deformation interpolation measure can be written in a form analogous to equation 5:

$$E(q, B, R, P) = \sqrt{E_d(q,B,R,P)} + \lambda\Sigma_{gs} B_{gs}\sqrt{D_{gs}} \qquad \text{Equation (10)}$$

The user of the square root in this equation allows for the results to better approximate piecewise linear interpolations as $C$ changes. The version without the square roots also works well, and may be a suitable alternative embodiment in situations where a low computational cost is paramount. Nonetheless, researchers have found that equation 10 can be computed quickly.

As mentioned above, in one or more embodiments, the stylized mesh deformation system optimizes equation 10 to determine a modified mesh. In particular, in one or more embodiments, the stylized mesh deformation system solves equation 10 (and optimizes the ARAP combined shape-space, deformation interpolation measure). In one or more embodiments, the stylized mesh deformation system reduces computational processing power by solving equation 10 in a two-step process.

Figure 4:
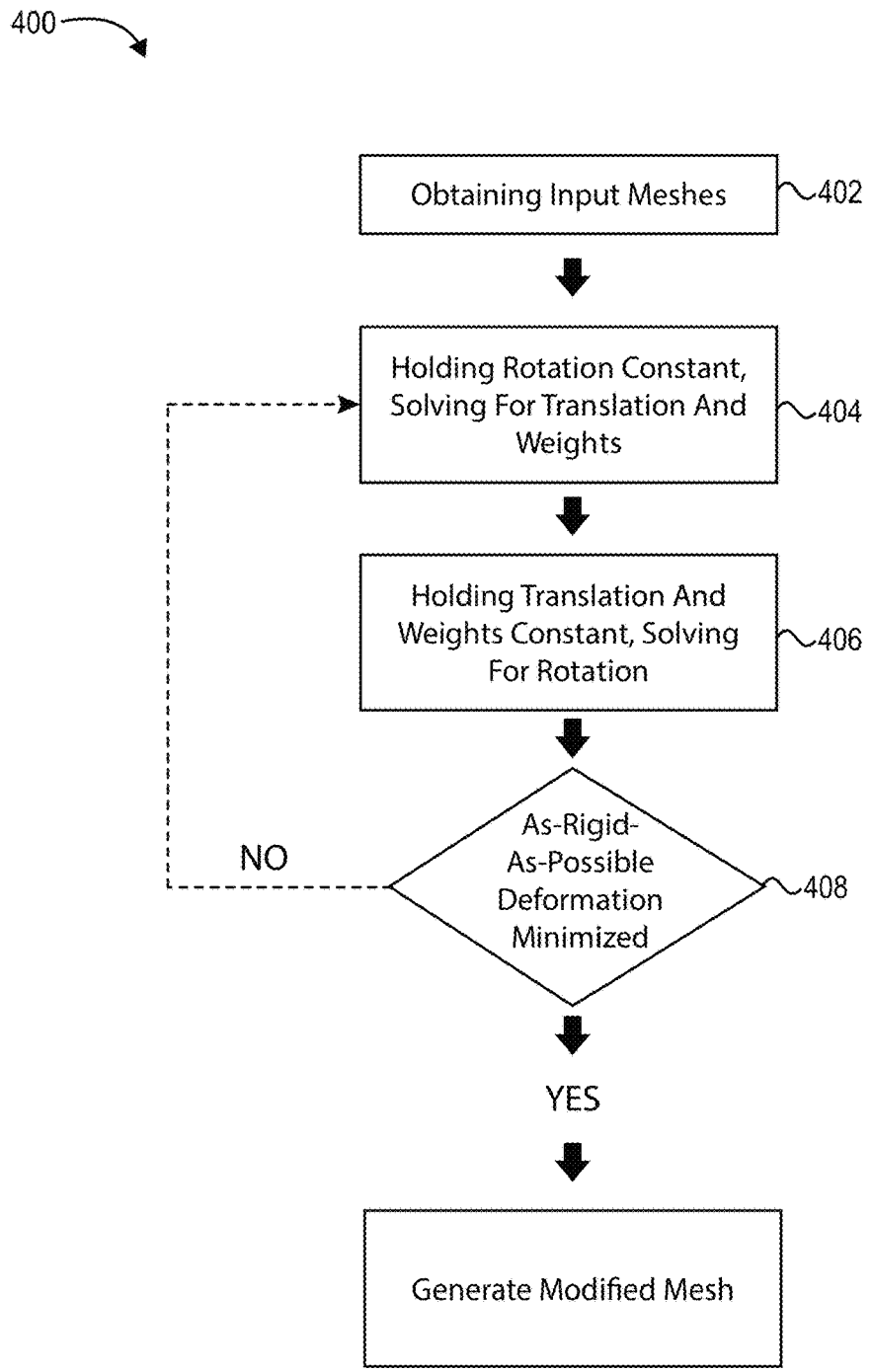
FIG. 4 illustrates a representation of optimizing an as-rigid-as-possible-deformation measure to generate a modified mesh in accordance with one or more embodiments.

For example, FIG. 4 illustrates a flowchart of a series of acts in a method 400 of optimizing an as-rigid-as-possible-deformation measure (e.g., the ARAP combined shape-space, deformation interpolation measure articulated in equation 10) in accordance with one or more embodiments. As shown, the method 400 includes the act 402 of obtaining input meshes. For example, as mentioned above, the method 400 includes obtaining user input of input meshes portraying a digital model in a variety of configurations.

Upon obtaining input meshes, the method 400 performs the act 404 of holding rotation constant and solving for translation and weights. For example, the stylized mesh deformation system holds rotation of each edge group in the input meshes constant and then minimizes the ARAP combined shape-space, deformation interpolation measure to solve for translation of the edge groups and weights applicable to each input edge group and input mesh. Indeed, by utilizing a linear blend skinning deformation model as described above, solving for translation and weights is equivalent to solving for a vector of vertex positions representing a modified mesh. Moreover, as outlined below, minimizing the ARAP combined shape-space, deformation interpolation measure simplifies to a convex optimization known as a second-order cone program (SOCP), as described in Boyd, S., and Vendenberghe, L., Convex Optimization, Cambridge University Press, New York, N.Y., USA (2004) hereby incorporated by reference in its entirety. The stylized mesh deformation system can utilize a conic optimizer to globally optimize the second-order cone program in a computationally efficient manner.

As shown in FIG. 4, the stylized mesh deformation system also performs the act 406 of holding translation and weights constant and solving for rotation. For example, the stylized mesh deformation system holds translation and weights applied to each edge group and each input shape constant and then minimize the ARAP combined shape-space, deformation interpolation measure to solve for rotation of each edge group from each shape. Because each edge group and each shape can contribute a different rotation, optimizing the ARAP combined shape-space, deformation interpolation measure to solve for rotation can lead to significant artifacts. Indeed, rotations from different input shapes (e.g., rotations 336-340) can counteract each other, leading to highly non-rigid transformations.

Accordingly, in one or more embodiments, the stylized mesh deformation system performs the act 406 by aligning deformed shapes utilized to calculate the ARAP deformation interpolation measure to the deformed shape utilized to calculate the ARAP shape-space deformation measure. To illustrate, in relation to the embodiment of FIG. 3, the stylized mesh deformation system can align the deformed meshes 330-334 to the deformed mesh 344. This has the result of solving for rotations without any deformation interpolation between different shapes (e.g., the ARAP input mesh deformation interpolation measure 322 does not reflect deformation from each of the input shapes 202-206). This simplifies the process of solving for rotations, without impacting the weights applicable to the input shapes (because the weights are held constant during the act 406).

As shown in FIG. 4, the stylized mesh deformation system also performs the act 408 of determining whether the as-rigid-as-possible-deformation measure is minimized. For example, in one or more embodiments, the act 408 includes determining whether an ARAP combined shape-space, deformation interpolation measure has converged. To illustrate, the act 408 can comprise determining whether a change in ARAP combined shape-space, deformation interpolation measures across iterations has changed within a certain threshold amount.

As shown, if the stylized mesh deformation system determines that the as-rigid-as-possible-deformation measure is not minimized (e.g., has not converged), the stylized mesh deformation system can continue to perform the acts 404 and 406. If the stylized mesh deformation system determines that the as-rigid-as-possible-deformation measure is minimized, the stylized mesh deformation system can perform the act 410 of generating a modified mesh. In particular, the stylized mesh deformation system can generate a modified mesh based on the translation, rotation, and weights solved in relation to the acts 404 and 406.

Although FIG. 4 illustrates generating a modified mesh by iteratively holding rotations and/or translation and weights constant, it will be appreciated that the stylized mesh deformation system can also generate a modified deformation utilizing alternative approaches. For example, in one or more embodiments, the stylized mesh deformation system does not optimize for rotations. Rather, the stylized mesh deformation system solves only for translations and weights. This allows the stylized mesh deformation system to compute a globally optimal modified mesh. This approach can provide good results with a guarantee of global optimality.

Furthermore, in one or more embodiments, the stylized mesh deformation system can also generate a modified mesh that solves for translation, rotation, and weights, without alternating between solving for translation/weights and rotations. For example, in one or more embodiments, the stylized mesh deformation system utilizes a trust region optimization approach to guarantee converged and solve for rotations, translations, and weights.

In addition to the description above, the stylized mesh deformation system can also be described in terms of equations and/or pseudocode implemented by a computing device to optimize an as-rigid-as-possible-deformation measure and generate an enhanced digital mesh. In particular, as just mentioned in relation to FIG. 4, the stylized mesh deformation system can solve equation 10 with an algorithm that alternates between two acts. First R is held fixed and T and B are solved for (e.g., the act 404). Then in the second act T and B are held fixed and R is solved for (e.g., the act 406). This process is repeated until convergence (or until a new frame is to be displayed in an animation in which case it is terminated early).

To solve for T and B while holding R fixed (e.g., the act 404) one or more embodiments of the stylized mesh deformation system utilize a linear blend skinning deformation model as described above. In particular, in utilizing a linear blend skinning deformation model, solving for T is equivalent to solving for the vector of vertex positions q representing the modified mesh. Plugging equation 6 into equation 9 to express $E_d(q, B, R, P)$ in terms of T as $E_d(T, B, R, P)$ and expanding yields as the sum of three terms:

$$E_d(T, B, R, P) = \tfrac{1}{2}E_{d_1}(T, P) - E_{d_2}(T, B, R, P) + \tfrac{1}{2}E_{d_3}(B, R, P) \qquad \text{Equation (11)}$$

The terms in this equation are straightforward to calculate and to implement in code, if somewhat notationally awkward to express:

$$E_{d_1}(T, P) = \Sigma_{h_1 h_2 s_1 s_2} tr(T_{h_1 s_1} \tilde{L}_{h_1 h_2 s_1 s_2} T_{h_2 s_2}^T) \qquad \text{Equation (12)}$$

$$\tilde{L}_{h_1 h_2 s_1 s_2} = \Sigma_{p_1 p_2} L_{p_1 p_2} M_{h_1 s_1 p_1} M_{h_2 s_2 p_2}^T \qquad \text{Equation (13)}$$

$$L_{p_1 p_2} = \Sigma_g \Sigma_{e \in g} c_e A_{e p_1} A_{e p_2} \qquad \text{Equation (14)}$$

where L is a $|\mathcal{P}|\times|\mathcal{P}|$ matrix and $\tilde{L}$ is a $|\mathcal{H}|\times|\mathcal{H}|\times|\mathcal{S}|\times|\mathcal{S}|$ array of $(k+1)\times(k+1)$ matrices.

Similarly, $E_{d_2}$ is expressed as:

$$E_{d_2}(T, B, R, P) = \Sigma_{ghs_1s_2} B_{gs_1} tr(R_{gs_1} \tilde{K}_{ghs_1s_2} T_{hs_2}^T) \quad \text{Equation (15)}$$

with $$\tilde{K}_{ghs_1s_2} = \Sigma_p K_{gs_1p} M_{hs_2p}^T \quad \text{Equation (16)}$$

$$K_{gs_1p} = \Sigma_{p_2} \Sigma_{e \in \mathcal{G}_g} c_e A_{ep_1} A_{ep_2} P_{sp_2} \quad \text{Equation (17)}$$

where K is a $|\mathcal{G}|\times|\mathcal{S}|\times|\mathcal{P}|$ array of length-k vectors and $\tilde{K}$ is a $|\mathcal{G}|\times|\mathcal{H}|\times|\mathcal{S}|\times|\mathcal{S}|$ array of $k\times k+1$ matrices. Moreover, $$E_{d_3}(B, R, P) = \Sigma_{gs_1s_2} B_{gs_1} B_{gs_2} tr(R_{gs_1} H_{gs_1s_2} R_{gs_2}^T) \quad \text{Equation (18)}$$

with $$H_{gs_1s_2} = \Sigma_{p_1p_2} \Sigma_{e \in \mathcal{G}_g} c_e A_{ep_1} A_{ep_2} P_{s_1p_1} P_{s_1p_2}^T \quad \text{Equation (19)}$$

where H is a $|\mathcal{G}|\times|\mathcal{S}|\times|\mathcal{S}|$ array of $k\times k$ matrices.

Assuming P is fixed in advance, these formulas for $E_{d_1}$, $E_{d_2}$, and $E_{d_3}$ allow $E_d$ to be calculated with a cost independent of $|\mathcal{P}|$ by precomputing $\tilde{L}$, $\tilde{K}$, and H. A similar substitution of q in terms of T can be made to solve for D. This allows equation 10 to be minimized with a cost independent of the resolution of the input meshes.

The stylized mesh deformation system can then optimize (i.e., minimize) equation 10 subject to user-specified constraints on the position of select vertices in q. For each handle this constraint is modeled by associating a single vertex $p_h$ with the handle and enforcing $\Sigma_s M_{hsp_h} T_{hs}^T = P_{eq_h}$ where $P_{eq_h}$ is the desired position of the vertex in the modified mesh. To summarize, the complete optimization for T and B (while holding R fixed) is given by:

$$\operatorname*{argmin}_{T,B} \sqrt{E_d(T, B, R, P)} + \lambda \sum_{gs} B_{gs} \sqrt{D_{gs}} \quad \text{Equation (20)}$$

such that $$\Sigma_s M_{hsp_h} T_{hs}^T = P_{eq_h} \quad 1 \leq h \leq |\mathcal{H}|$$

$$B_{gs} \geq 0 \quad 1 \leq g \leq |\mathcal{G}|, \quad 1 \leq s \leq |\mathcal{S}|$$

$$\Sigma_s B_{gs} = 1 \quad 1 \leq g \leq |\mathcal{G}|$$

To minimize equation 20, observe that $E_d(T, B, R, P)$ is quadratic in vec(T, B) where vec is the vectorization operator stacking the scalar components of T and B into a single vector of length $|\mathcal{H}||\mathcal{S}|k(k+1)+|\mathcal{G}||\mathcal{S}|$. Accordingly, solving equation 20 for T and B reduces to minimizing the sum of the square root of a quadratic form and a linear function subject to a set of linear constraints. This illustrates one of the benefits of the fact that equation 5 preserves convexity, as this problem is an instance of a second-order cone program (SOCP) which can be quickly be globally minimized. Problems of this form are easily solved with an off-the-shelf conic optimizer. In one or more embodiments, the stylized mesh deformation system solves with a general nonlinear optimizer to increase efficiency. In particular, in one or more embodiments, the stylized mesh deformation system utilizes SNOPT, as described in Gill, P. E., Murray, W., & Saunders, M. A., SNOPT: An SQP Algorithm for Large-Scale Constrained Optimization, SIAM Journal On Optimization 12, 979-1006 (1997) hereby incorporated by reference in its entirety.

As discussed above, in one or more embodiments, the stylized mesh deformation system also performs a second phase in optimizing equation 10, which solves for R while holding T and B fixed (e.g., the act 406). As mentioned above, minimizing equation 10 for R directly, however, can lead to significant artifacts. In contrast to a standard ARAP energy, equation 8 employs a local rotation matrix $R_{gs}$ for each pair of edge group and base shape, rather than simply a rotation matrix for each edge group. This allows the different base shapes to be automatically locally rotationally aligned, but has the disadvantage that directly including $R_{gs}$ rotations in an energy minimization gives rise to highly non-rigid transformations since the rotation matrices for the different shapes can sum to counteract each other.

In one or more embodiments, the stylized mesh deformation system resolves this issue by solving the local rotations independently for each input shape by aligning $p_s$ directly to q without any interpolation between the different shapes. This is achieved by defining $R_{gs}$ as the g,sth element of the array R minimizing equation 10 for just the single base shape $p_s$.

$$R_{gs} = \left[\operatorname*{argmin}_R E(q, B, R, p_s)\right]_{gs} \quad \text{Equation (21)}$$

$$\text{s.t. } R_{gs} \in SO(k)$$

Similar to equation 8, the notation $[X]_{gs}$ is used to refer to a single element in the matrix X. As when solving for T and B, this can be solved without explicitly representing q by instead representing the minimization in terms of T and B.

$$R_{gs} = \left[\operatorname*{arg\,max}_{R \in SO(k)} E_{d2}(T, B, R, p_s)\right]_{gs} = \operatorname*{arg\,max}_{R \in SO(k)} tr(R\hat{K}_{gs}) \quad \text{Equation (22)}$$

where $\hat{K}$ is the $|\mathcal{G}|\times|\mathcal{S}|$ array of $k\times k$ matrices representation contraction of $\tilde{K}$ by T and B:

$$\hat{K}_{gs_1} = \Sigma_{hs_2} B_{gs_1} \tilde{K}_{ghs_1s_2} T_{hs_2}^T \quad \text{Equation (23)}$$

Note that the term $E_{d_3}$ does not appear in equation 22 because when computed for a single shape $p_s$, the instances of R in equation 18 cancel, rendering $E_{d_3}$ independent of R. The matrix $R_{gs}$ maximizing equation 22 over SO(k) can be found independently for each g, s by solving a Procrustes alignment problem as $R_{gs} = VU^T$ where $R_{gs} = UDV^T$ is the singular value decomposition of $\hat{K}_{gs_1}$.

Accordingly, in one or more embodiments, the stylized mesh deformation system optimizes equation 10 by alternating between solving for T and B and solving for R. Technically, this alternating minimization is not guaranteed to converge. That said, researches have not observed this to be a serious problem in practice.

That said, to guarantee optimization the stylized mesh deformation system can also utilized a different optimization algorithm. As mentioned above, to guarantee convergence the non-linearities introduced by the solution for R can be incorporated into the solution for T and B. This adds a non-trivial additional complexity to the optimizer to cover relatively rare failure cases. As T and B are updated, the value of R changes according to equation 22. To account for this, the stylized mesh deformation system can linearize the effect of R on E(T, B, R, P) and minimize equation 20 with a trust region approach. This linearization approximates E in the vicinity of $R \approx R_0$ as:

$$E(T, B, R, P) \approx E(T, B, R_0, P) + \partial_R E \quad \text{Equation (24)}$$

where $\partial_R E$ is the linearization of the effect the R has on E as T and B vary and can be simplified as:

$$\partial_R E = \frac{1}{2\sqrt{E_d(T, B, R, P)}} \partial_R E_d$$

$$= \frac{1}{4\sqrt{E_d(T, B, R, P)}} \partial_R E_{d3}$$

where the last equality results from observing that $E_{d1}$ is independent of R and that the definition of R via equation 22 means that $\partial_R E_{d2}=0$. Letting x represent a single parameter of T and using equation 18 gives:

$$\partial_R E_{d3} = \sum_{gs_1 s_2} B_{gs_1} B_{gs_2} tr(H_{gs_1 s_2} dR_{gs_1 s_2})$$

with $$dR_{gs_1 s_2} = R_{gs_2}^T(c) + (\partial_x R_{gs_2})^T R_{gs_1}$$

where $\partial_x R_{gs}$ is calculated as described by CITE:

$$\partial_x R_{gs} = U\Omega V^T$$

where U and V come from the singular value decomposition of $\hat{K}_{gs}$ and $\Omega$ is a k×k matrix such that:

$$\Omega_{ij} = \frac{[U^T(\partial_x \hat{K}_{gs})V]_{ij} - [U^T(\partial_x \hat{K}_{gs})V]_{ji}}{D_{ii} + D_{jj}}$$

The term $\partial_x \hat{K}_{gs}$ in this equation represents the partial derivative of $\hat{K}_{gs}$ with respect to x and is straightforward to compute by differentiating equation 23.

To complete the algorithm solving for T and B, the stylized mesh deformation system can start with an initial guess $T_0$, $B_0$ and minimize equation 24 subject to the constraints in equation 20 and the additional constraint that $\|vec(T, B) - vec(T_0, B_0)\| \le r$. The scalar r is a trust radius ensuring that the optimization converges, and a sufficiently small value of r guarantees a decrease in the optimization's objective function. This optimization is another SOCP which may be solved with the same technique as equation 20.

In one or more embodiments, the trust radius r starts at r=1 and varies dynamically during the course of the optimization. If solving for T and B then recomputing R yields a decrease in E, then the stylized mesh deformation system updates r'=max($\rho$r, 1) and proceeds. Otherwise, the stylized mesh deformation system sets r'=max($\rho^{-1}$r, 1) and resolves. In one or more embodiments, the stylized mesh deformation system utilizes the relatively aggressive value $\rho$=10 as a reflection of the empirical observation that the trust region is rarely necessary, but when it is r normally needs to be relatively small to ensure a decrease in E.

Furthermore, as mentioned above, in one or more embodiments, the stylized mesh deformation system can also optimize equation 20 based on T and B without optimizing for R. Without optimization for rotations, the stylized mesh deformation system can solve equation 20 once for T and B. In addition, each suboptimization involved in computing D reduces to solving a single linear system. This allows the stylized mesh deformation system to efficiently determine a globally optimal deformed mesh q by solving a series of $|S|$ linear systems followed by a single SOCP. Because one or more embodiments of the stylized mesh deformation system do not rely on nonlinearities in the object function to reliably interpolate between shapes, when applicable this technique can give good results along with a guarantee of global optimality. Researchers have found facial expression manipulation to be a domain where this applies particularly well.

Figure 5:
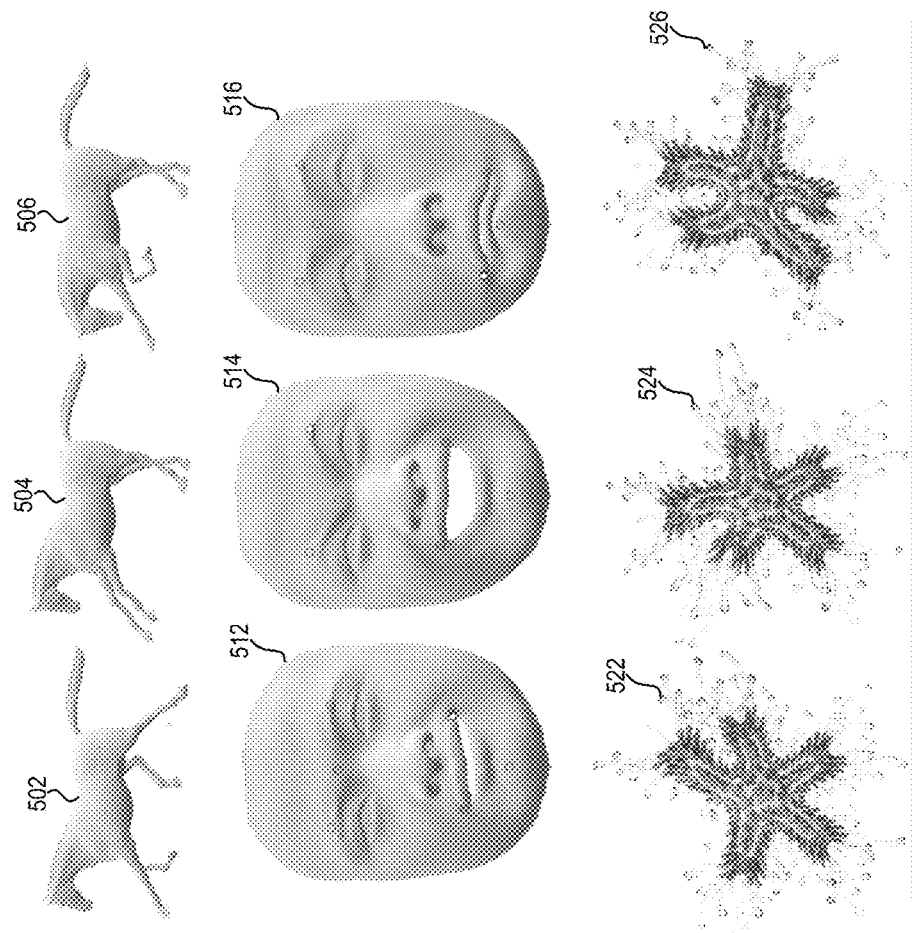
FIG. 5 illustrates a representation of results of applying the stylized mesh deformation system to generate modified meshes in accordance with one or more embodiments.

Although many of the example embodiments discussed in relation to FIGS. 3-5 illustrate implementation of an as-rigid-as-possible-deformation measure in the form of an ARAP combined shape-space, deformation interpolation measure, the stylized mesh deformation system can also utilize an as-rigid-as-possible-deformation measure in a different form (i.e., without utilizing a combined shape-space, deformation interpolation measure). Indeed, in one or more embodiments, the stylized mesh deformation system utilizes a different ARAP measure to generate a modified mesh from multiple input meshes (and/or determine spatially localized combinations of input meshes).

For example, rather than generating an ARAP combined shape-space, deformation interpolation measure, in one or more embodiments, the stylized mesh deformation system utilizes an ARAP input mesh deformation interpolation measure or an ARAP shape-space deformation measure to generate a modified mesh. For instance, the stylized mesh deformation system can utilize an ARAP input mesh deformation interpolation measure in isolation (e.g., the ARAP input mesh deformation interpolation measure 322) to generate a modified mesh. Indeed, the stylized mesh deformation system can utilize an ARAP input mesh deformation interpolation measure to identify weights for generating a modified mesh. Moreover, the stylized mesh deformation system can utilize an ARAP input mesh deformation interpolation measure to generate edge-specific and shape specific weights such that the modified mesh reflects spatially localized combinations of different input meshes.

Similarly, the stylized mesh deformation system can utilize an ARAP shape-space deformation measure (e.g., the ARAP shape-space deformation measure 324) to generate a deformed mesh. For instance, the stylized mesh deformation system can utilize an ARAP shape-space deformation measure to identify weights for generating a modified mesh. Moreover, the stylized mesh deformation system can utilize an ARAP shape-space deformation measure to generate edge-specific and shape specific weights such that the modified mesh reflects spatially localized combinations of different input meshes.

Furthermore, although many embodiments described in relation to FIGS. 3-5 discuss spatially localized combinations of different input shapes, the stylized mesh deformation system can also operate without making spatially localized combinations. For example, the stylized mesh deformation system can utilize an ARAP combined shape-space, deformation interpolation energy that does not vary weights in relation to different edge groups in a particular input mesh. Indeed, although the stylized mesh deformation system can provide spatially localized combinations of input shapes as an additional benefit, the stylized mesh deformation system need not provide such a feature in all embodiments.

As mentioned above, implementation of the stylized mesh deformation system can produce results that provide a number of advantages over conventional systems. Researchers have conducted a number of experiments to illustrate the effectiveness of various embodiments of the stylized mesh deformation system. For example, FIG. 5 illustrates a plurality of example-based deformations using an ARAP combined shape-space, deformation interpolation measure in the context of an interactive system for mesh-based inverse kinematics. In particular, FIG. 5 illustrates a first plurality of modified meshes 502-506 (i.e., different configurations of a horse), a second plurality of modified meshes 512-516 (i.e., different configurations of a face), and a third plurality of modified meshes 522-526 (i.e., different configurations of a starfish). The stylized mesh deformation system generates the modified meshes 502-506, 512-516, 522-526 based on user interaction indicating movement of control points.

After loading a set of example shapes and specifying the positions of control points on those shapes (by selecting vertices on one of the meshes), the user can interactively click and drag the control points around (or otherwise provide user input) while the result mesh deforms accordingly. As illustrated in FIG. 5, the stylized mesh deformation system can operate on either two-or three-dimensional meshes (i.e., three-dimensional models such as the horse or two-dimensional models such as the starfish). Moreover, as shown in FIG. 5, researchers have found the stylized mesh deformation system to work well for a wide range of different cases, including click-and-drag animation of stylized creatures, posing articulated characters, and face expression manipulation.

Moreover, as shown in FIGS. 6A-6B, the stylized mesh deformation system can reliably interpolate between input shapes in an intuitive manner while avoiding artifacts present in existing formulations. In particular, FIG. 6A illustrates a first plurality of modified meshes 602a-602n generated by at least one embodiment of the stylized mesh deformation system. Specifically, FIG. 6A illustrates the first plurality of modified meshes 602a-602n generated utilizing an ARAP combined shape-space, deformation interpolation measure. As shown, in response to movement of a control point 604 (and/or a control point 606), the stylized mesh deformation system generates the plurality of modified meshes 602a-602n, which smoothly coil in and out to generate lifelike representations of a snake based on input meshes (e.g., the input meshes 102a-102e). Moreover, the stylized mesh deformation system shown in FIG. 6A smoothly interpolates between input shapes. This reliability ensures that all of the artist-provided input shapes are actually used in an intuitive way in the final result.

In contrast, FIG. 6B illustrates a second plurality of modified meshes 610a-610n generated utilizing a conventional shape-space approach, as described in *Schumacher* 2012. As shown, despite having the same input meshes and the same movement in relation to the control points 604, 606, the second plurality of modified meshes 610a-610n do not incorporate all of the input shapes (for example, the second plurality of modified meshes 610a-610n fail to incorporate the input mesh 102c). Moreover, the second plurality of modified meshes 610a-610n do not provide the range of expressive combinations produced via the stylized mesh deformation system.

Figure 7A:
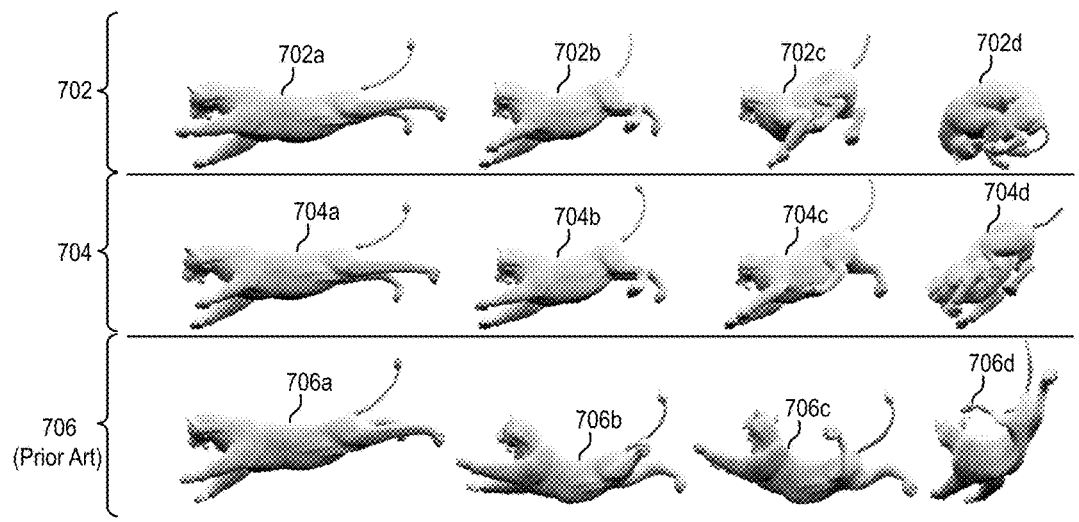
FIGS. 7A-7B illustrate another comparison of manipulating a digital model based on one or more embodiments of the stylized mesh deformation system and based on one or more conventional example-based deformation systems.

Similarly, the stylized mesh deformation system can also avoid many of the artifacts associated with conventional systems. For example, FIG. 7A illustrates a first group of modified meshes 702, a second group of modified meshes 704, and a third group of modified meshes 706. The stylized mesh deformation system generates the first group of modified meshes 702 utilizing an ARAP combined shape-space, deformation interpolation measure, and the stylized mesh deformation system generates second group of modified meshes 704 utilizing only an ARAP shape-space deformation measure. The third group of resulting modified meshes 706 was generated utilizing a conventional shape-space system, as described in *Schumacher* 2012.

As shown in FIG. 7A, the third group of modified meshes 706 include a variety of artifacts. For instance, legs of the lion portrayed in the modified meshes 706b-706n flail out in awkward, disjointed directions. In contrast, the first group of modified meshes 702 and the second group of modified meshes 704 do not suffer from the same deficiencies.

Notably, the first group of modified meshes 702 (generated utilizing the ARAP combined shape-space, deformation interpolation measure) curls up in a more realistic expressive combination of input shapes. This is a result of utilizing the ARAP combined shape-space, deformation interpolation measure, which allows the stylized mesh deformation system to combine the input shapes more accurately based on the deformation required from each input shape and based on the deformation of the combined input shapes.

Figure 7B:
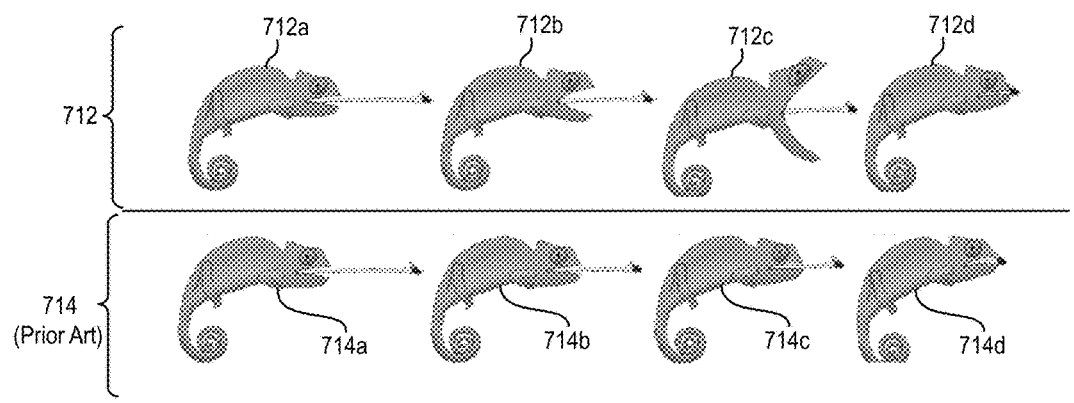

Similarly, FIG. 7B illustrates a first group of modified meshes 712 and a second group of modified meshes 714. The stylized mesh deformation system generates the first group of modified meshes 712 with an embodiment that utilizes an ARAP combined shape-space, deformation interpolation measure. The second group of resulting modified meshes 714 was generated utilizing a conventional shape-space system, as described in Schumacher 2012.

As shown, in the second group of modified meshes 714 the chameleon fails to open its mouth (despite an input mesh of the chameleon opening its mouth). Rather, the conventional shape-space system omits input meshes indicating that the chameleon opens its mouth when control points are at particular positions, in favor of combinations of other input meshes. In contrast, in the first group of modified meshes 712, the chameleon opens and closes its mouth as intended (based on input meshes).

As articulated above, the stylized mesh deformation system can also generate spatially variable blending of input shapes in generating modified meshes. This allows additional expressiveness, such as different limbs performing differently based on being drawn from different input meshes. Thus, for example, the stylized mesh deformation system can draw on one input mesh to raise a horse's leg, and draw on another input mesh to lower a separate leg. Without this ability, the stylized mesh deformation system introduces artifacts when users attempt to introduce combinations that differ spatially across input meshes.

Figure 8:
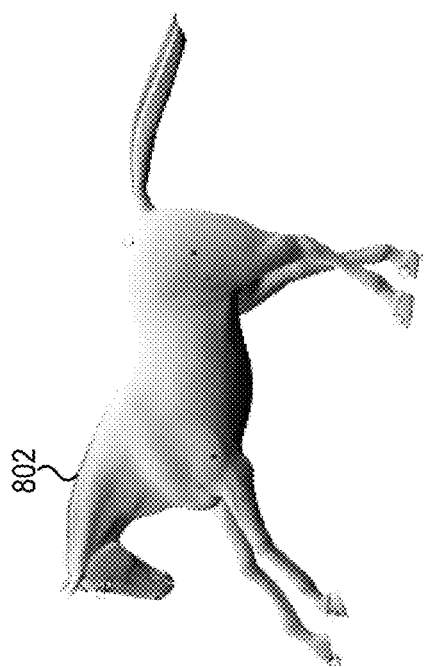
FIG. 8 illustrates a comparison of manipulating a digital model based on one or more embodiments of the stylized mesh deformation system with spatially varying blending of input meshes and based on one or more embodiments of the stylized mesh deformation system without spatially varying blending of input meshes.
Figure 8:
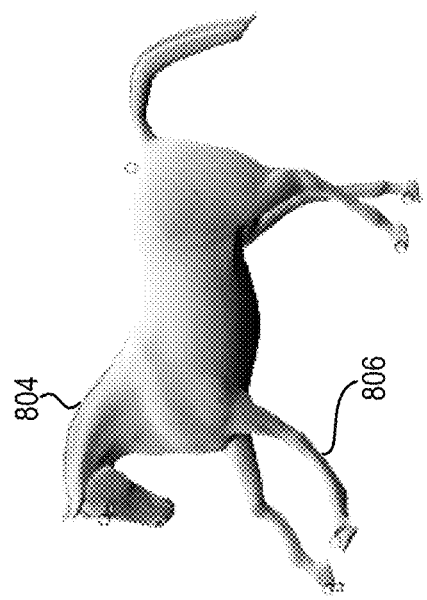

For example, FIG. 8 illustrates two modified meshes 802, 804. The stylized mesh deformation system generates the first modified mesh 802 utilizing an embodiment that includes spatially localized blending of input shapes (i.e., utilizing an ARAP combined space-shape, deformation interpolation measure with spatially varying blending). The stylized mesh deformation system generates the second modified mesh 802 utilizing an embodiment that does not include spatially localized blending of input shapes (i.e., utilizing an ARAP combined space-shape, deformation interpolation measure without spatially varying blending).

As shown, in FIG. 8, by utilizing spatially varying blending the first modified mesh 802 can portray a new configuration of the horse's legs, where different legs draw on different combinations of input meshes to retain their integrity. However, without spatially varying blending the second modified mesh 804 includes an unnatural bend 806 in the horse's front leg. This is a result of attempting to globally combine input meshes to a configuration that is not reflected in any single combination of the input meshes. Thus, removal of spatially varying blending has the effect of introducing artifacts in how limbs of characters deform, and removes the ability of the user to freely manipulate the individual limbs without issue.

As mentioned above, the stylized mesh deformation system can also generate modified meshes without requiring significant processing power or computation time. Table 1 lists the runtime performance of the stylized mesh deformation system utilizing an ARAP combined shape-space, deformation interpolation measure on a number of examples as measured on an unoptimized single-threaded C++ implementation running on a 2.4 GHz Intel®Xeon®E5-2630. The bulk of the runtime computation is spent within the nonlinear optimizer solving equation 20. The times shown in the table are for a single iteration of the alternating optimization (i.e., the two-step optimization described above). Depending on the model, between half and 90% of the precomputation time is spent calculating the skinning weights for each handle.

TABLE 1

| Model | k | $|\mathcal{P}|$ | $|\mathcal{S}|$ | $|\mathcal{H}|$ | Precompute (s) | Runtime (s) |
|---|---|---|---|---|---|---|
| Snake | 2 | 817 | 5 | 2 | 0.05 | 0.01 |
| Starfish | 2 | 3532 | 3 | 6 | 0.65 | 0.015 |
| Plant | 2 | 3152 | 3 | 4 | 0.8 | 0.01 |
| Horse | 3 | 8431 | 3 | 10 | 30 | 0.05 |
| Lion | 3 | 5000 | 6 | 7 | 5.0 | 0.15 |
| Cat | 3 | 7307 | 6 | 7 | 8.0 | 0.15 |
| Head | 3 | 15941 | 7 | 6 | 79 | 0.17 |
| Face | 3 | 23725 | 6 | 9 | 74 | 0.22 |

In sum, researchers have found the stylized mesh deformation system to provide a simple, intuitive, and expressive choice for example-based mesh deformation. The deformation reliably draws from the input shapes, and neither over-blends between them nor ignores a suitable input shape when one exists. Furthermore, the fact that the interpolations are spatially localized avoids a number of counterintuitive artifacts resulting from global blends, and also allows the stylized mesh deformation system to provide a smaller set of input shapes than would otherwise be necessary.

Figure 9:
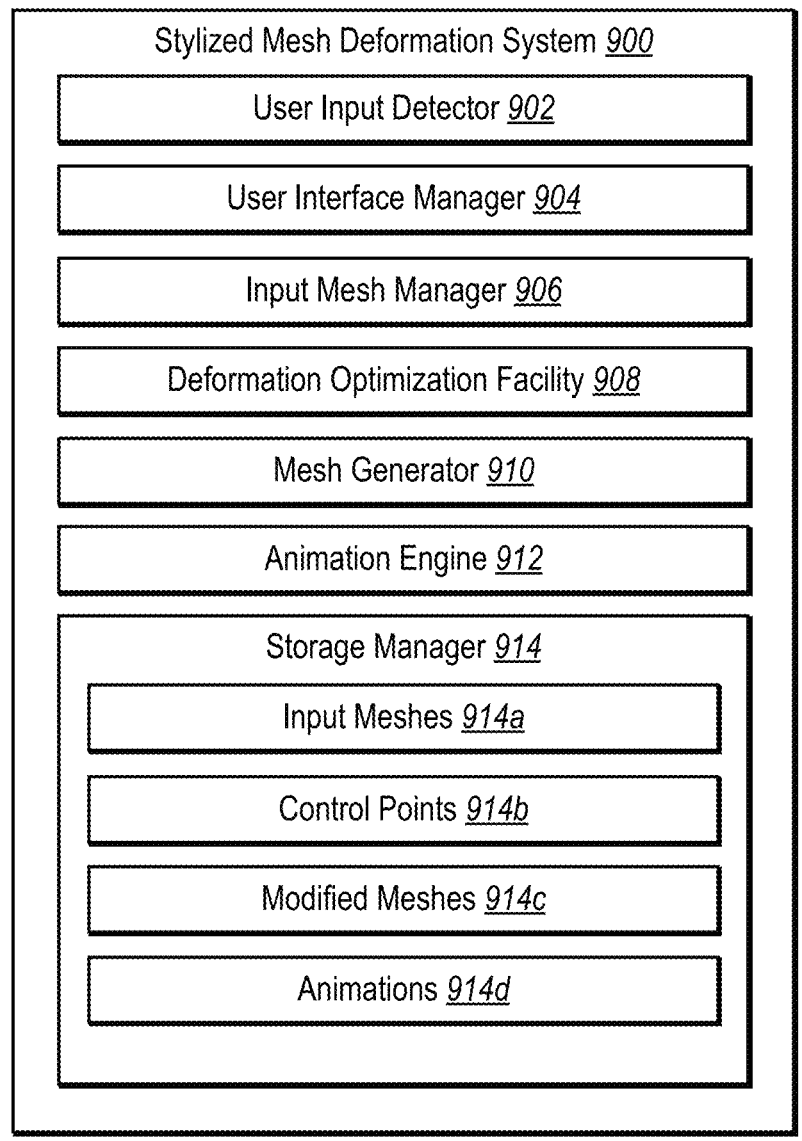
FIG. 9 illustrates a schematic diagram illustrating a stylized mesh deformation system in accordance with one or more embodiments.

Turning now to FIG. 9, additional detail is provided regarding components and capabilities of one embodiment of the stylized mesh deformation system. In particular, FIG. 9 illustrates an embodiment of an exemplary stylized mesh deformation system 900 (e.g., the stylized mesh deformation system referenced above). As shown, the stylized mesh deformation system 900 may include, but is not limited to a user input detector 902, a user interface manager 904, an input mesh manager 906, a deformation optimization facility 908, a mesh generator 910, an animation engine 912, and a storage manager 914 (comprising input meshes 914a, control points 914b, deformed meshes 914c, and animations 914d).

As just mentioned, and as illustrated in FIG. 9, the stylized mesh deformation system 900 may include the user input detector 902. The user input detector 902 can detect, identify, monitor, receive, process, capture, and/or record various types of user input. For example, the user input detector 902 can detect one or more user interactions with respect to a user interface and/or a control point. In particular, the user input detector 902 can detect user input of a click, select, drag, and/or release event in relation to a control point portrayed via a user interface.

The user input detector 902 can operate in conjunction with any number of user input devices or computing devices (in isolation or in combination), including personal computers, laptops, smartphones, smart watches, tablets, touch-screen devices, televisions, personal digital assistants, mouse devices, keyboards, track pads, or stylus devices. The user input detector 902 detects and identifies various types of user interactions with user input devices, such as press events, drag events, scroll events, release events, and so forth. For example, in the event a client device corresponding to the stylized mesh deformation system 900 includes a touch screen, the user input detector 902 detects one or more touch gestures (e.g., swipe gestures, tap gestures, pinch gestures, or reverse pinch gestures) from a user that forms a user interaction.

As just mentioned, and as illustrated in FIG. 9, the stylized mesh deformation system 900 also includes the user interface manager 904. The user interface manager 904 provides, manages, and/or controls a graphical user interface (or simply "user interface") for use with the stylized mesh deformation system 900. In particular, the user interface manager 904 can facilitate presentation of information by way of an external component of a client device (e.g., the computing device 104). For example, the user interface manager 904 can display a user interface by way of a display screen associated with a client device. The user interface may be composed of a plurality of graphical components, objects, and/or elements that allow a user to perform a function. The user interface manager 904 presents, via a client device, a variety of types of information, including text, images, video, audio, characters, or other information. Moreover, the user interface manager 904 provides a variety of user interfaces (e.g., the user interface 120) specific to any variety of functions, programs, applications, plug-ins, devices, operating systems, and/or components of a client device. In addition, the user interface manager 904 can provide a variety of elements for display, including an input mesh, a modified mesh, and an animation.

As shown in FIG. 9, the stylized mesh deformation system 900 also includes the input mesh manager 906. The input mesh manager 906 can identify, receive, determine, and/or generate one or more input meshes. In particular, the input mesh manager 906 can identify input meshes that reflect different configurations of a common digital mesh with a set of common vertices. Moreover, the input mesh manager 906 can identify one or more control points in relation to one or more input meshes. For example, the input mesh manager 906 can receive a selection of a vertex and generate a control point corresponding to the vertex. Furthermore, in one or more embodiments, the stylized mesh deformation system can utilize a modified mesh generated by the stylized mesh deformation system 900 as an input mesh at a future point in time (e.g., utilize the modified meshes 914c from a first project as input meshes 914a in a second project).

As illustrated in FIG. 9, the stylized mesh deformation system 900 also includes the deformation optimization facility 908. The deformation optimization facility 908 can reduce, minimize, optimize, and/or modify one or more measures to deform input meshes. In particular, the deformation optimization facility 908 can optimize a combined space-shape, deformation interpolation measure; an as-rigid-as-possible-deformation measure; an ARAP combined space-shape, deformation interpolation measure; an ARAP shape-space deformation measure; and/or an ARAP input mesh deformation interpolation measure. For example, the deformation optimization facility 908 can modify weights applicable to input meshes to optimize one or more measures. Moreover, the deformation optimization facility 908 can variably modify weights across different portions of a mesh to optimize one or more measures in relation to particular portions of the mesh. In addition, the deformation optimization facility 908 can modify weights, translations, and/or rotations simultaneously or in different acts as described above.

As shown in FIG. 9, the stylized mesh deformation system 900 also includes the mesh generator 910. The mesh generator 910 can create, determine, provide, and/or generate a modified mesh. In particular, the mesh generator 910 can create a modified mesh that reflects the optimized measure determined by the deformation optimization facility 908. Moreover, the mesh generator 910 can provide the modified mesh for display.

In addition to the mesh generator 910, as illustrated in FIG. 9, the stylized mesh deformation system 900 also includes the animation engine 912. In particular, the animation engine 912 can create, generate, determine, and/or identify one or more animations. For example, the animation engine 912 can generate an animation based on a plurality of modified meshes (e.g., modified meshes provided via the mesh generator 910). In particular, the animation engine 912 can generate an animation that reflects modified meshes based on changes to a control point (e.g., based on user input received via the user input detector 902 indicating movement of control points generated by the input mesh manager 906).

Moreover, as illustrated in FIG. 9, the stylized mesh deformation system 900 also includes the storage manager 914. The storage manager 914 maintains data to perform the functions of the stylized mesh deformation system 900. As illustrated, the storage manager 914 includes input meshes 914a, control points 914b, modified meshes 914c, and animations 914d.

Each of the components 902-914 of the stylized mesh deformation system 900 (as shown in FIG. 9) may be in communication with one another using any suitable communication technologies. It will be recognized that although components 902-914 of the stylized mesh deformation system 900 are shown to be separate in FIG. 9, any of components 902-914 may be combined into fewer components, such as into a single facility or module, divided into more components, or configured into different components as may serve a particular embodiment.

The components 902-914 of the stylized mesh deformation system 900 can comprise software, hardware, or both. For example, the components 902-914 can comprise one or more instructions stored on a computer-readable storage medium and executable by processors of one or more computing devices. When executed by the one or more processors, the computer-executable instructions of the stylized mesh deformation system 900 can cause a client device and/or a server device to perform the methods described herein. Alternatively, the components 902-914 and their corresponding elements can comprise hardware, such as a special purpose processing device to perform a certain function or group of functions. Additionally, the components 902-914 can comprise a combination of computer-executable instructions and hardware.

Furthermore, the components 902-914 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-914 may be implemented as a stand-alone application, such as a desktop or mobile application. Furthermore, the components 902-914 may be implemented as one or more web-based applications hosted on a remote server. The components 902-914 may also be implemented in a suit of mobile device applications or "apps." To illustrate, the components 902-914 may be implemented in an application, including but not limited to ADOBE® CHARACTER ANIMATOR® software or ADOBE® PHOTOSHOP® software. "ADOBE," "CHARACTER ANIMATOR," and "PHOTOSHOP," are either registered trademarks or trademarks of Adobe Systems Incorporated in the United States and/or other countries.

Figure 10:
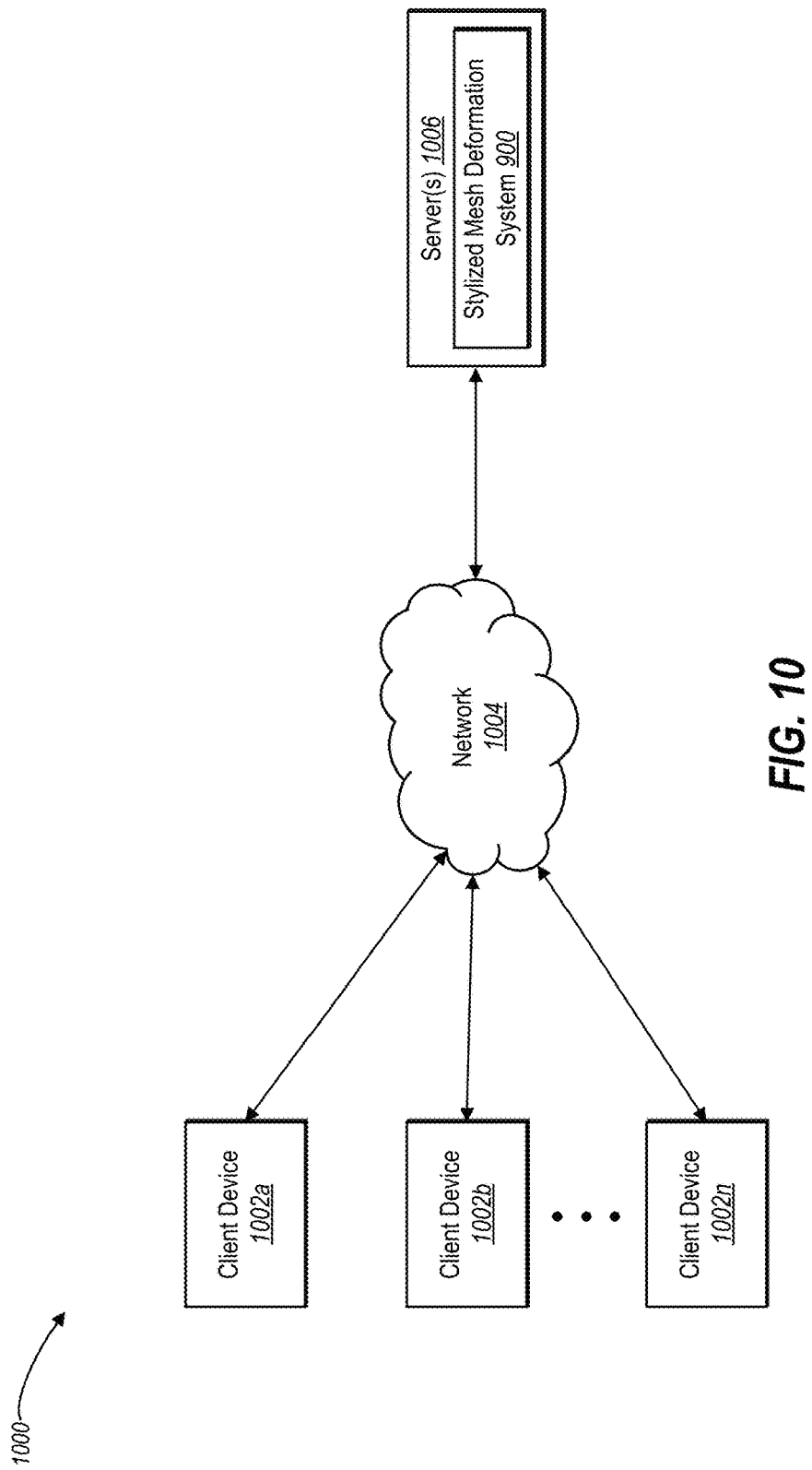
FIG. 10 illustrates a schematic diagram illustrating an exemplary environment in which the stylized mesh deformation system may be implemented in accordance with one or more embodiments.

FIG. 10 illustrates a schematic diagram of one embodiment of an exemplary environment 1000 in which the stylized mesh deformation system 900 can operate. In one or more embodiments, the exemplary environment 1000 includes one or more client devices 1002a, 1002b, . . . 1002n, a network 1004, and server(s) 1006. The network 1004 may be any suitable network over which the computing devices can communicate. Example networks are discussed in more detail below with regard to FIG. 13.

As illustrated in FIG. 10, the environment 1000 may include client devices 1002a-1002n. The client devices 1002a-1002n may comprise any computing device. For instance, in one or more embodiments, one or more of the client devices 1002a-1002n comprise one or more computing devices described below in relation to FIG. 13.

In addition, the environment 1000 may also include the server(s) 1006. The server(s) 1006 may generate, store, receive, and transmit any type of data, including input meshes 914a, control points 914b, modified meshes 914c, and animations 914d. For example, the server(s) 1006 may transmit data to a client device, such as the client device 1002a. The server(s) 1006 can also transmit electronic messages between one or more users of the environment 1000. In one example embodiment, the server(s) 1006 comprise a content server. The server(s) 1006 can also comprise a communication server or a web-hosting server. Additional details regarding the server(s) 1006 will be discussed below with respect to FIG. 13.

As illustrated, in one or more embodiments, the server(s) 1006 can include all, or a portion of, the stylized mesh deformation system 900. In particular, the stylized mesh deformation system 900 can comprise an application running on the server(s) 1006 or a portion of a software application that can be downloaded from the server(s) 1006. For example, the stylized mesh deformation system 900 can include a web hosting application that allows the client devices 1002a-1002n to interact with content hosted at the server(s) 1006. To illustrate, in one or more embodiments of the exemplary environment 1000, one or more client devices 1002a-1002n can access a webpage supported by the server(s) 1006. In particular, the client device 1002a can run an application to allow a user to access, view, and/or interact with a webpage or website hosted at the server(s) 1006.

Although FIG. 10 illustrates a particular arrangement of the client devices 1002a-1002n, the network 1004, and the server(s) 1006, various additional arrangements are possible. For example, while FIG. 10 illustrates multiple separate client devices 1002a-1002n communicating with the server(s) 1006 via the network 1004, in one or more embodiments a single client device may communicate directly with the server(s) 1006, bypassing the network 1004.

Similarly, although the environment 1000 of FIG. 10 is depicted as having various components, the environment 1000 may have additional or alternative components. For example, the stylized mesh deformation system 900 can be implemented on a single computing device. In particular, the stylized mesh deformation system 900 may be implemented in whole by the client device 1002a or the stylized mesh deformation system 900 may be implemented in whole by the server(s) 1006. Alternatively, the stylized mesh deformation system 900 may be implemented across multiple devices or components (e.g., utilizing the client devices 1002a-1002n and the server(s) 1006).

By way of example, in one or more embodiments, the client device 1002a can send a request to the server(s) 1006 for input meshes stored on the server(s) 1006. The server(s) 1006 can provide a plurality of meshes (e.g., via the input mesh manager 906 and the input meshes 914a) for display to the client device 1002a (e.g., via the user interface manager 904). The client device 1002a can provide user input (e.g., via the user input detector 902) selecting input meshes for generating a modified mesh (e.g., via the input mesh manager 906). Moreover, the client device 1002a can provide user input indicating one or more control points corresponding to the input meshes (e.g., via the input mesh manager 906). The server(s) 1006 can provide an initial mesh (e.g., one of the selected input meshes) with the control points for display to the client device 1002a (e.g., via the user interface manager 904). Moreover, the client device 1002a can provide user input indicating movement of one or more of the control points (e.g., via the user input detector 902). In response, the server(s) 1006 can generate a modified mesh (e.g., via the deformation optimization facility 908 and the mesh generator 910). In particular, the server(s) 1006 can optimize an ARAP combined shape-space, deformation interpolation measure and determine weights for combining the selected input meshes (e.g., via the deformation optimization facility 908). Furthermore, the server(s) 1006 can generate a modified mesh by combining the selected input meshes based on the ARAP combined shape-space, deformation interpolation measure (e.g., via the mesh generator 910). Moreover, the server(s) 1006 can provide the modified mesh for display to the client device 1002a (e.g., via the animation engine 912).

In addition, the server(s) 1006 can also store the modified mesh and/or utilize the modified mesh as an input mesh in the future (e.g., via the storage manager 914 and the input mesh manager 906). For example, the stylized mesh deformation system can receive a request from the client device 1002b for input meshes stored on the server(s) 1006. In response, the server(s) 1006 can provide input meshes to the client device 1002b, including the modified mesh generated by the client device 1002a.

Figure 11:
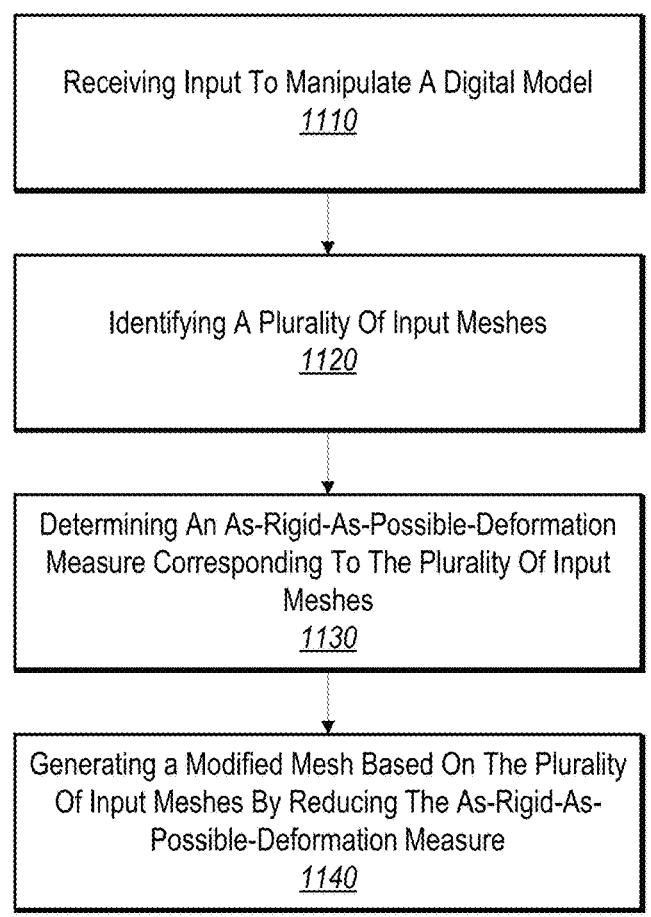
FIG. 11 illustrates a flowchart of a series of acts in a method of manipulating a digital model utilizing a plurality of input meshes in accordance with one or more embodiments.
Figure 12:
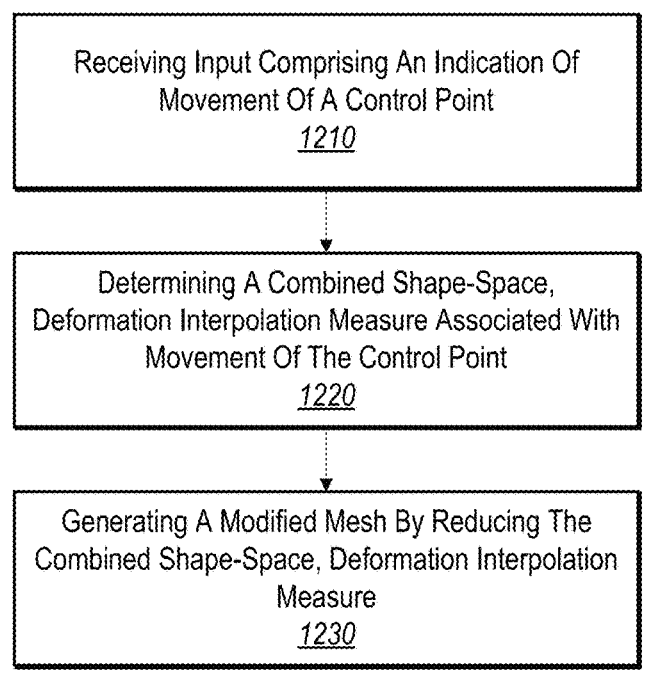
FIG. 12 illustrates another flowchart of a series of acts in a method of manipulating a digital model utilizing a plurality of input meshes in accordance with one or more embodiments.

FIGS. 1A-10, the corresponding text, and the examples, provide a number of different systems and devices for rendering digital images of a virtual environment utilizing full path space learning. In addition to the foregoing, embodiments can also be described in terms of flowcharts comprising acts and steps in a method for accomplishing a particular result. For example, FIGS. 11-12 illustrates flowcharts of exemplary methods in accordance with one or more embodiments. The methods described in relation to FIGS. 11-12 may be performed with less or more steps/acts or the steps/acts may be performed in differing orders. Additionally, the steps/acts described herein may be repeated or performed in parallel with one another or in parallel with different instances of the same or similar steps/acts.

FIG. 11 illustrates a flowchart of a series of acts in a method 1100 of generating modified meshes based on input meshes in accordance with one or more embodiments. In one or more embodiments, the method 900 is performed in a digital medium environment that includes the stylized mesh deformation system 900. The method 900 is intended to be illustrative of one or more methods in accordance with the present disclosure, and is not intended to limit potential embodiments. Alternative embodiments can include additional, fewer, or different steps than those articulated in FIGS. 11-12.

As illustrated in FIG. 11, the method 1100 includes an act 1110 of receiving input to manipulate a digital model. In particular, the act 1110 can include receiving input to manipulate a digital model defined by a mesh of vertices, the input comprising an indication of movement of a control point of the digital model to a new location.

As shown in FIG. 11, the method 1100 also includes an act 1120 of identifying a plurality of input meshes. In particular, the act 1120 can include identifying a plurality of input meshes of the digital model, each input mesh comprising the mesh of vertices in a different configuration In addition, as shown in FIG. 11, the method 1100 also includes and act 1130 of determining an as-rigid-as-possible-deformation measure corresponding to the plurality of input meshes. In particular, the act 1130 can include determining an as-rigid-as-possible-deformation measure corresponding to the plurality of input meshes based on the movement of the control point to the new location, wherein the as-rigid-as-possible-deformation measure is based on an amount of translation and rotation of the plurality of input meshes and weights for combining the plurality of input meshes. For example, the act 1130 can include determining an ARAP combined shape-space, deformation interpolation measure associated with moving the vertex corresponding to the control point to the new location based on both an ARAP input mesh deformation interpolation measure and an ARAP shape-space deformation measure.

To illustrate, in one or more embodiments, the act 1130 includes determining the ARAP input mesh deformation interpolation measure based on a product of a first as-rigid-as-possible-deformation measure of each input mesh to move the control point to the new location and the weights; and determining the ARAP shape-space deformation measure based on a second as-rigid-as-possible-deformation measure of a blended mesh generated by blending the plurality of input meshes according to the weights.

Moreover, in one or more embodiments, the act 1130 includes determining a first as-rigid-as-possible-deformation measure for a first subset of the vertices based on a first set of translations of the first subset of the vertices from the plurality of input meshes, a first set of rotations of the first subset of the vertices from the plurality of input meshes, and a first set of weights applied to the plurality of input meshes; and determining a second as-rigid-as-possible-deformation measure for a second subset of the vertices based on a second set of translations of the second subset of the vertices from the plurality of input meshes, a second set of rotations of the second subset of common vertices from the plurality of input meshes, and a second set of weights applied to the plurality of input meshes.

Further, as illustrated in FIG. 11, the method 1100 also includes an act 1140 of generating a modified mesh based on the plurality of input meshes by reducing the as-rigid-as-possible-deformation measure. In particular, the act 1140 can include generating a modified mesh based on the plurality of input meshes by modifying the translation and the rotation of the plurality of input meshes and modifying the weights to reduce the as-rigid-as-possible-deformation measure. For example, the act 1140 can comprise minimizing the ARAP combined shape-space, deformation interpolation measure associated with moving the vertex corresponding to the control point to the new location.

To illustrate, in one or more embodiments, the act 1140 includes generating a first modified vertex of the modified mesh based on a first combination of the plurality of input meshes; and generating a second modified vertex of the modified mesh based on a second combination of the plurality of input meshes, wherein the first combination is different than the second combination. For instance, in one or more embodiments, the first combination is based on the first set of weights applied to the plurality of input meshes; and the second combination is based on the second set of weights applied the plurality of input meshes.

Moreover, in one or more embodiments, the act 1140 further comprises, while holding the rotation of the plurality of input meshes constant, modifying the translation of the plurality of input meshes and the weights for combining the plurality of input meshes to reduce the as-rigid-as-possible-deformation measure; and, while holding the translation of the plurality of input meshes and the weights for combining the plurality of input meshes constant, modifying the rotation of the plurality of input meshes to reduce the as-rigid-as-possible-deformation measure.

Moreover, in one or more embodiments, the modified mesh minimizes the combined shape-space, deformation interpolation measure. Further, in one or more embodiments, the modified mesh reflects a combination of the plurality of input meshes with a subset of the vertices corresponding to the control point positioned at the new location.

Moreover, in one or more embodiments, a first vertex of the modified mesh reflects a first combination of the plurality of input meshes and a second vertex of the modified mesh reflects a second combination of the plurality of input meshes, wherein the first combination and the second combination are different. For example, in one or more embodiments, the first combination of the plurality of input meshes comprises a first set of input meshes from the plurality of input meshes; and wherein the second combination comprises a second set of input meshes from the plurality of input meshes, wherein the first set of input meshes is different than the second set of input meshes. In other embodiments, the first combination is based on a first weight applied to each input mesh from the plurality of input meshes; and wherein the second combination is based on a second weight applied to each input mesh from the plurality of input meshes.

Further, in one or more embodiments, the method 1100 further comprises generating an animation in real-time as the control point moves to the new location, wherein the animation includes the modified mesh.

Embodiments can also be described in terms of computer implemented methods or systems. For example, one or more embodiments include, in a digital medium environment for computer-based manipulation of a digital object, a computer-implemented method of combining input shapes to generate deformed shapes, comprising:

receiving input to manipulate a digital model defined by a mesh of vertices, the input comprising an indication of movement of a control point of the digital model to a new location;

identifying a plurality of input meshes of the digital model, each input mesh comprising the mesh of vertices in a different configuration; and a step for generating a modified mesh from the plurality of input meshes with the control point at the new location based on a combined shape-space, deformation interpolation measure to manipulate the digital model.

Furthermore, the method can also include, wherein the modified mesh minimizes the combined shape-space, deformation interpolation measure.

In addition, the method can also include, wherein the modified mesh reflects a combination of the plurality of input meshes with a subset of the vertices corresponding to the control point positioned at the new location.

The method can also include, wherein the combined-shape-space, deformation interpolation measure comprises an as-rigid-as-possible-deformation measure, wherein the as-rigid-as-possible-deformation measure reflects local deviation from rigidity based on an amount of translation and rotation of one or more vertices of the plurality of input meshes relative to one or more adjacent vertices of the plurality of input meshes to generate the modified mesh.

In addition, the method can also include, wherein a first vertex of the modified mesh reflects a first combination of the plurality of input meshes and a second vertex of the modified mesh reflects a second combination of the plurality of input meshes, wherein the first combination and the second combination are different.

Moreover, the method can also include, wherein the first combination of the plurality of input meshes comprises a first set of input meshes from the plurality of input meshes; and wherein the second combination comprises a second set of input meshes from the plurality of input meshes, wherein the first set of input meshes is different than the second set of input meshes.

The method can also include, wherein the first combination is based on a first weight applied to each input mesh from the plurality of input meshes; and wherein the second combination is based on a second weight applied to each input mesh from the plurality of input meshes.

The method can further comprise generating an animation in real-time as the control point moves to the new location, wherein the animation includes the modified mesh.

In addition, one or more embodiments include, in a digital medium environment for computer-based manipulation of a digital object, a computer-implemented method of combining input shapes to generate deformed shapes, comprising:

receiving input to manipulate a digital model defined by a mesh of vertices, the input comprising an indication of movement of a control point of the digital model to a new location;

identifying a plurality of input meshes of the digital model, each input mesh comprising the mesh of vertices in a different configuration;

determining an as-rigid-as-possible-deformation measure corresponding to the plurality of input meshes based on the movement of the control point to the new location, wherein the as-rigid-as-possible-deformation measure is based on an amount of translation and rotation of the plurality of input meshes and weights for combining the plurality of input meshes; and generating a modified mesh based on the plurality of input meshes by modifying the translation and the rotation of the plurality of input meshes and modifying the weights to reduce the as-rigid-as-possible-deformation measure.

The method can also include, wherein determining the as-rigid-as-possible-deformation measure comprises, determining an ARAP combined shape-space, deformation interpolation measure associated with moving the vertex corresponding to the control point to the new location based on both an ARAP input mesh deformation interpolation measure and an ARAP shape-space deformation measure.

The method can further comprise:

determining the ARAP input mesh deformation interpolation measure based on a product of a first as-rigid-as-possible-deformation measure of each input mesh to move the control point to the new location and the weights; and determining the ARAP shape-space deformation measure based on a second as-rigid-as-possible-deformation measure of a blended mesh generated by blending the plurality of input meshes according to the weights.

The method can also include, wherein generating the modified mesh further comprises minimizing the ARAP combined shape-space, deformation interpolation measure associated with moving the vertex corresponding to the control point to the new location.

The method can also include, wherein determining the as-rigid-as-possible-deformation measure further comprises:

determining a first as-rigid-as-possible-deformation measure for a first subset of the vertices based on a first set of translations of the first subset of the vertices from the plurality of input meshes, a first set of rotations of the first subset of the vertices from the plurality of input meshes, and a first set of weights applied to the plurality of input meshes; and determining a second as-rigid-as-possible-deformation measure for a second subset of the vertices based on a second set of translations of the second subset of the vertices from the plurality of input meshes, a second set of rotations of the second subset of common vertices from the plurality of input meshes, and a second set of weights applied to the plurality of input meshes.

In addition, the method can also include, wherein generating the modified mesh further comprises:

generating a first modified vertex of the modified mesh based on a first combination of the plurality of input meshes; and generating a second modified vertex of the modified mesh based on a second combination of the plurality of input meshes, wherein the first combination is different than the second combination.

Moreover, the method can also include, wherein the first combination is based on the first set of weights applied to the plurality of input meshes; and wherein the second combination is based on the second set of weights applied the plurality of input meshes.

In addition, the method can also include, modifying the translation and the rotation of the plurality of input meshes and modifying the weights further comprises:

while holding the rotation of the plurality of input meshes constant, modifying the translation of the plurality of input meshes and the weights for combining the plurality of input meshes to reduce the as-rigid-as-possible-deformation measure; and while holding the translation of the plurality of input meshes and the weights for combining the plurality of input meshes constant, modifying the rotation of the plurality of input meshes to reduce the as-rigid-as-possible-deformation measure.

In addition, one or more embodiments also include a system for efficiently generating modified digital meshes from existing digital meshes, comprising:

one or more memories comprising:
a digital model defined by a mesh of vertices;
a plurality of input meshes, wherein each input mesh comprises the mesh of vertices in a different configuration; and
a control point corresponding to at least one vertex of the mesh;

at least one server storing instructions thereon, that, when executed by the at least one server, cause the system to:

receive input to manipulate the digital model, the input comprising an indication of movement of the control point of the digital model to a new location;

determine a combined shape-space, deformation interpolation measure associated with movement of the control point to the new location by performing steps comprising:

determining an input mesh deformation interpolation measure based on a product of a measure of deformation of each input mesh to move the control point to the new location and weights applied to each input mesh; and determining a shape-space deformation measure based on a measure of deformation of a blended mesh generated by blending the plurality of input meshes according to the weights; and generate a modified digital mesh by modifying the weights to reduce the combined shape-space, deformation interpolation measure.

The system can include, wherein the combined shape-space, deformation interpolation measure comprises an as-rigid-as-possible-deformation measure, wherein the as-rigid-as-possible-deformation measure reflects local deviation from rigidity based on an amount of translation and rotation of one or more vertices of the plurality of input meshes relative to one or more adjacent vertices of the plurality of input meshes.

In addition, the system can also include, wherein:
the input mesh deformation interpolation measure comprises:
a first product of a first as-rigid-as-possible-deformation measure of a first subset of the vertices and a first weight;
and a second product of a second measure of as-rigid-as-possible-deformation of a second subset of the vertices and a second weight; and
the shape-space deformation measure comprises:
a third as-rigid-as-possible-deformation measure of a first blended mesh generated by blending the first subset of the vertices from the plurality of input shapes according to the first weights; and
a fourth as-rigid-as-possible-deformation measure of a second blended mesh generated by blending the second set of the vertices according to the second weights.

Moreover, the system can further comprise instructions that, when executed by the at least one server, cause the system to generate the enhanced digital mesh by performing steps comprising:

generating a first modified vertex of the modified mesh based on a first combination of the plurality of input meshes; and generating a second modified vertex of the modified mesh based on a second combination of the plurality of input meshes, wherein the first combination is different than the second combination.

FIG. 12 illustrates a flowchart of a series of acts in a method 1200 of generating modified meshes based on input meshes in accordance with one or more embodiments. The method 1200 includes an act 1210 of receiving input comprising an indication of movement of a control point. In particular, the act 1210 includes receiving input to manipulate the digital model, the input comprising an indication of movement of the control point of the digital model to a new location.

As shown in FIG. 12, the method 1200 also includes an act 1220 of determining a combined shape-space, deformation interpolation measure associated with movement of the control point. In particular, the act 1220 can include determining a combined shape-space, deformation interpolation measure associated with movement of the control point to the new location by: determining an input mesh deformation interpolation measure based on a product of a measure of deformation of each input mesh to move the control point to the new location and weights applied to each input mesh; and determining a shape-space deformation measure based on a measure of deformation of a blended mesh generated by blending the plurality of input meshes according to the weights.

To illustrate, in one or more embodiments, combined shape-space, deformation interpolation measure comprises an as-rigid-as-possible-deformation. In particular, the combined shape-space, deformation interpolation measure can reflect local deviation from rigidity based on an amount of translation and rotation of one or more vertices of the plurality of input meshes relative to one or more adjacent vertices of the plurality of input meshes to generate the modified mesh.

Moreover, in one or more embodiments, the input mesh deformation interpolation measure comprises a first product of a first as-rigid-as-possible-deformation measure of a first subset of the vertices and a first weight; and a second product of a second measure of as-rigid-as-possible-deformation of a second subset of the vertices and a second weight. In addition, in one or more embodiments, the shape-space deformation measure comprises a third as-rigid-as-possible-deformation measure of a first blended mesh generated by blending the first subset of the vertices from the plurality of input shapes according to the first weights; and a fourth as-rigid-as-possible-deformation measure of a second blended mesh generated by blending the second set of the vertices according to the second weights.

Moreover, as illustrated in FIG. 12, the method 1200 also includes an act 1230 of generating a modified mesh by reducing the combined shape-space, deformation interpolation measure. In particular, the act 1230 can include generating a modified digital mesh by modifying the weights to reduce the combined shape-space, deformation interpolation measure. For example, the act 1230 can include modifying the weights to minimize the combined shape-space, deformation interpolation measure.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
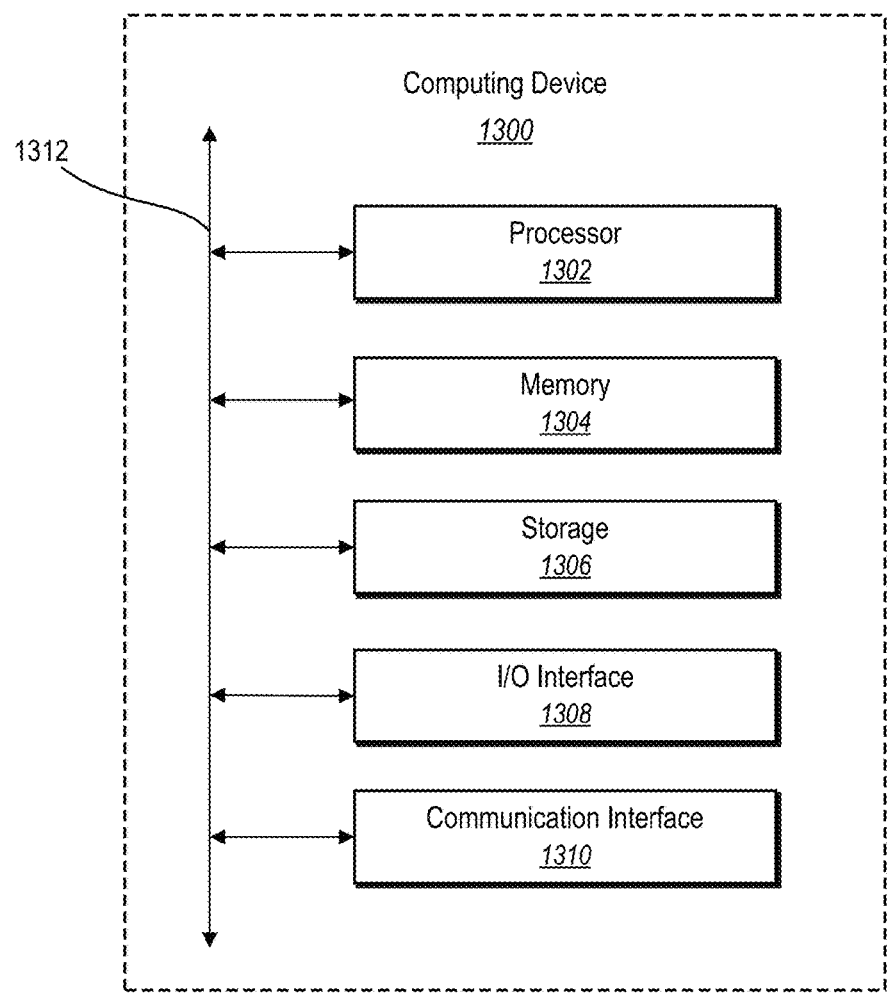
FIG. 13 illustrates a block diagram of an exemplary computing device in accordance with one or more embodiments.

FIG. 13 illustrates, in block diagram form, an exemplary computing device 1300 that may be configured to perform one or more of the processes described above. One will appreciate that the stylized mesh deformation system 900 can comprise implementations of the computing device 1300. As shown by FIG. 13, the computing device can comprise a processor 1302, memory 1304, a storage device 1306, an I/O interface 1308, and a communication interface 1310. In certain embodiments, the computing device 1300 can include fewer or more components than those shown in FIG. 13. Components of computing device 1300 shown in FIG. 13 will now be described in additional detail.

In particular embodiments, processor(s) 1302 includes hardware for executing instructions, such as those making up a computer program. As an example and not by way of limitation, to execute instructions, processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example and not by way of limitation, storage device 1306 can comprise a non-transitory storage medium described above. The storage device 1306 may include a hard disk drive (HDD), flash memory, a Universal Serial Bus (USB) drive or a combination of these or other storage devices.

The computing device 1300 also includes one or more input or output ("I/O") devices/interfaces 1308, which are provided to allow a user to provide input to (such as user strokes), receive output from, and otherwise transfer data to and from the computing device 1300. These I/O devices/interfaces 1308 may include a mouse, keypad or a keyboard, a touch screen, camera, optical scanner, network interface, modem, other known I/O devices or a combination of such I/O devices/interfaces 1308. The touch screen may be activated with a stylus or a finger.

The I/O devices/interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1308 is configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 can provide one or more interfaces for communication (such as, for example, packet-based communication) between the computing device and one or more other computing devices 1300 or one or more networks. As an example and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can comprise hardware, software, or both that couples components of computing device 1300 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

I claim:

1. In a digital medium environment for computer-based manipulation of a digital object, a computer-implemented method of combining input shapes to generate deformed shapes, comprising:
   receiving an input to manipulate a digital model defined by a mesh of vertices, the input comprising an indication of a movement of a control point of the digital model to a new location;
   identifying a plurality of input meshes of the digital model, each input mesh comprising the mesh of vertices in a different configuration; and
   a step for generating a modified mesh from the plurality of input meshes with the control point at the new location based on a combined shape-space, deformation interpolation measure to manipulate the digital model,
   wherein the combined shape-space, deformation interpolation measure comprises an as-rigid-as-possible-deformation measure reflecting local deviation from rigidity based on an amount of translation and rotation of one or more vertices of the plurality of input meshes relative to one or more adjacent vertices of the plurality of input meshes.

2. The method of claim 1, wherein the modified mesh minimizes the combined shape-space, deformation interpolation measure.

3. The method of claim 1, wherein the modified mesh reflects a combination of the plurality of input meshes with a subset of vertices from the mesh of vertices corresponding to the control point positioned at the new location.

4. The method of claim 1, further comprising in response to receiving the indication of the movement of the control point of the digital model to the new location, providing the modified mesh with the control point at the new location for display.

5. The method of claim 1, wherein a first vertex of the modified mesh reflects a first combination of the plurality of input meshes and a second vertex of the modified mesh reflects a second combination of the plurality of input meshes, wherein the first combination and the second combination are different.

6. The method of claim 5, wherein the first combination of the plurality of input meshes comprises a first set of input meshes from the plurality of input meshes; and wherein the second combination comprises a second set of input meshes from the plurality of input meshes, wherein the first set of input meshes is different than the second set of input meshes.

7. The method of claim 5, wherein the first combination is based on a first weight applied to each input mesh from the plurality of input meshes; and wherein the second combination is based on a second weight applied to each input mesh from the plurality of input meshes.

8. The method of claim 1, further comprising generating an animation in real-time as the control point moves to the new location, wherein the animation includes the modified mesh.

9. In a digital medium environment for computer-based manipulation of a digital object, a computer-implemented method of manipulating digital models, comprising:
    receiving an input to manipulate a digital model defined by a mesh of vertices, the input comprising an indication of a movement of a control point of the digital model to a new location;
    identifying a plurality of input meshes of the digital model, each input mesh comprising the mesh of vertices in a different configuration;
    determining an as-rigid-as-possible-deformation measure corresponding to the plurality of input meshes based on the movement of the control point to the new location, wherein the as-rigid-as-possible-deformation measure is based on an amount of translation and rotation of the plurality of input meshes and weights for combining the plurality of input meshes; and
    generating a modified mesh based on the plurality of input meshes by modifying the translation and the rotation of the plurality of input meshes and modifying the weights to reduce the as-rigid-as-possible-deformation measure.

10. The method of claim 9, wherein determining the as-rigid-as-possible-deformation measure comprises, determining an ARAP combined shape-space, deformation interpolation measure associated with moving a vertex corresponding to the control point to the new location based on both an ARAP input mesh deformation interpolation measure and an ARAP shape-space deformation measure.

11. The method of claim 10, further comprising:
    determining the ARAP input mesh deformation interpolation measure based on a product of a first as-rigid-as-possible-deformation measure of each input mesh to move the control point to the new location and the weights; and
    determining the ARAP shape-space deformation measure based on a second as-rigid-as-possible-deformation measure of a blended mesh generated by blending the plurality of input meshes according to the weights.

12. The method of claim 11, wherein generating the modified mesh further comprises minimizing the ARAP combined shape-space, deformation interpolation measure associated with moving the control point to the new location.

13. The method of claim 9, wherein determining the as-rigid-as-possible-deformation measure further comprises:
    determining a first as-rigid-as-possible-deformation measure for a first subset of vertices from the plurality of input meshes based on a first set of translations of the first subset of vertices from the plurality of input meshes, a first set of rotations of the first subset of vertices from the plurality of input meshes, and a first set of weights applied to the plurality of input meshes; and
    determining a second as-rigid-as-possible-deformation measure for a second subset of the vertices based on a second set of translations of the second subset of the vertices from the plurality of input meshes, a second set of rotations of the second subset of vertices from the plurality of input meshes, and a second set of weights applied to the plurality of input meshes.

14. The method of claim 13, wherein generating the modified mesh further comprises:
    generating a first modified vertex of the modified mesh based on a first combination of the plurality of input meshes; and
    generating a second modified vertex of the modified mesh based on a second combination of the plurality of input meshes, wherein the first combination is different than the second combination.

15. The method of claim 14, wherein the first combination is based on the first set of weights applied to the plurality of input meshes; and wherein the second combination is based on the second set of weights applied the plurality of input meshes.

16. The method of claim 9, wherein modifying the translation and the rotation of the plurality of input meshes and modifying the weights further comprises:
    while holding the rotation of the plurality of input meshes constant, modifying the translation of the plurality of input meshes and the weights for combining the plurality of input meshes to reduce the as-rigid-as-possible-deformation measure; and
    while holding the translation of the plurality of input meshes and the weights for combining the plurality of input meshes constant, modifying the rotation of the plurality of input meshes to reduce the as-rigid-as-possible-deformation measure.

17. A system for efficiently generating modified digital meshes from existing digital meshes, comprising:
    one or more memories comprising:
        a digital model defined by a mesh of vertices;
        a plurality of input meshes, wherein each input mesh comprises the mesh of vertices in a different configuration; and
        a control point corresponding to at least one vertex of the mesh of vertices;

at least one server storing instructions thereon, that, when executed by the at least one server, cause the system to:
receive an input to manipulate the digital model, the input comprising an indication of a movement of the control point to a new location;
determine a combined shape-space, deformation interpolation measure associated with the movement of the control point to the new location by performing steps comprising:
determining an input mesh deformation interpolation measure based on a product of a measure of deformation of each input mesh to move the control point to the new location and weights applied to each input mesh; and
determining a shape-space deformation measure based on a measure of deformation of a blended mesh generated by blending the plurality of input meshes according to the weights; and
generate a modified digital mesh by modifying the weights to reduce the combined shape-space, deformation interpolation measure.

18. The system of claim 17, wherein the combined shape-space, deformation interpolation measure comprises an as-rigid-as-possible-deformation measure, wherein the as-rigid-as-possible-deformationmeasure reflects local deviation from rigidity based on an amount of translation and rotation of one or more vertices of the plurality of input meshes relative to one or more adjacent vertices of the plurality of input meshes.

19. The system of claim 17, wherein:
the input mesh deformation interpolation measure comprises:
a first product of a first as-rigid-as-possible-deformation measure of a first subset of the vertices and a first weight;
and a second product of a second measure of as-rigid-as-possible-deformation of a second subset of the vertices and a second weight; and
the shape-space deformation measure comprises:
a third as-rigid-as-possible-deformation measure of a first blended mesh generated by blending the first subset of the vertices from the plurality of input meshes according to the first weight; and
a fourth as-rigid-as-possible-deformation measure of a second blended mesh generated by blending the second subset of the vertices according to the second weight.

20. The system of claim 17, further comprising instructions that, when executed by the at least one server, cause the system to generate the modified digital mesh by performing steps comprising:
generating a first modified vertex of the modified digital mesh based on a first combination of the plurality of input meshes; and
generating a second modified vertex of the modified digital mesh based on a second combination of the plurality of input meshes, wherein the first combination is different than the second combination.

* * * * *